United States Patent
Shimizuya et al.

(10) Patent No.: US 6,261,203 B1
(45) Date of Patent: Jul. 17, 2001

(54) TOROIDAL TYPE CONTINUOUSLY VARIABLE TRANSMISSION

(75) Inventors: Masayoshi Shimizuya; Makoto Fujinami; Hiroyuki Itoh; Seiji Higuchi; Nobuo Goto, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/471,340

(22) Filed: Dec. 23, 1999

(30) Foreign Application Priority Data

Dec. 28, 1998 (JP) .................................................. 10-372343
Jan. 20, 1999 (JP) .................................................. 11-011968

(51) Int. Cl.⁷ .................................................. F16H 15/38
(52) U.S. Cl. ........................ 476/40; 29/898.13; 384/568; 384/569; 384/625; 476/42
(58) Field of Search ........................ 476/40, 42; 384/568, 384/569, 625; 29/898.066, 898.13

(56) References Cited

U.S. PATENT DOCUMENTS

| 4,579,395 | * | 4/1986 | Teramachi .................................. 384/7 |
| 5,556,348 | | 9/1996 | Kokubu et al. ............................ 476/40 |
| 5,735,769 | | 4/1998 | Takemura et al. ......................... 476/40 |
| 6,174,257 | * | 1/2001 | Imanishi et al. ........................... 476/40 |

FOREIGN PATENT DOCUMENTS

| 62-71465 | 5/1987 | (JP) ................................. F16H/15/38 |
| 1-173552 | 12/1989 | (JP) ................................. F16H/15/38 |
| 8-338493 | 12/1996 | (JP) ................................. F16H/15/38 |
| 9-14373 | 1/1997 | (JP) ................................. F16H/15/38 |
| 10-231908 | 9/1998 | (JP) ................................. F16H/15/38 |
| 11-141638 | 5/1999 | (JP) ................................. F16H/15/38 |
| 11-148543 | 6/1999 | (JP) ................................. F16H/15/38 |

* cited by examiner

Primary Examiner—Allan D. Herrmann
(74) Attorney, Agent, or Firm—Sughrue, Mion, Zinn, Macpeak & Seas, PLLC

(57) ABSTRACT

In the toroidal-type continuously variable transmission, the radial needle roller bearing includes a plurality of needle rollers, the two end portions of each of the needle rollers in the axial direction thereof are crowned, and the crowning amount is set such that, in the portion of the needle roller that is situated by 7–13% of the axial-direction length toward the axial-direction central portion of the needle roller from the axial-direction end face of the needle roller, the crowning amount is 0.1–0.4% of the outside diameter of the axial-direction central portion of the needle roller. Further, in the inner peripheral surface of the output-side disk, there are formed a fitting portion to be fitted outside with a member rotatable in conjunction with the output-side disk and an outer race raceway portion for the needle roller bearing, in the portion of the inner peripheral surface of the output-side disk that is situated near to the inside surface thereof, there is formed a residual compressive stress layer by shot peening, and the outer race raceway portion is ground so as to remove a portion of the residual compressive stress layer, to thereby form the outer race raceway portion as a smooth surface.

4 Claims, 22 Drawing Sheets

TOROIDAL TYPE CONTINUOUSLY VARIABLE TRANSMISSION

BACKGROUND OF THE INVENTION

1. Field of the Invention

The present invention relates to a toroidal type continuously variable transmission which may be used as a transmission unit constituting a vehicular transmission or may be assembled as transmissions into various types of industrial machines.

2. Description of the Related Art

Study on the application of a toroidal type continuously variable transmission (as shown in FIGS. 8 and 9) into a transmission unit constituting a vehicular transmission progresses. An example of the toroidal type continuously variable transmission is disclosed in Japanese Utility Model Unexamined Publication Sho.62-71465.

In a conventional toroidal type continuously variable transmission shown in FIGS. 8 and 9, an input-side disk 2 is concentrically supported to an input shaft 1. An output shaft 3 is also disposed concentrically with an input shaft 1. An output-side disk 4 is fastened to the inner end of the output shaft 3. In the inside of a casing in which the toroidal type continuously variable transmission is stored, there are located a pair of trunnions 6, 6. The trunnions 6, 6 are swingable about their respective pivot shafts 5, 5 respectively disposed at position along an imaginary plane that is perpendicular to an imaginary line connecting the respective axes of the input and output shafts 1 and 3, and distanced from the intersection of the imaginary plane and imaginary line, as shown in FIG. 8. This physical relation is hereinafter referred to as "torsional relation".

Each of the trunnions 6, 6 located distant from the center axis of the input-side disk 2 and the output-side disk 4 is provided with each of the pivot shafts 5, 5 on the outer side surfaces of the two end portions thereof to be perpendicular to a direction of the center axis thereof and be concentrically with each other. The base end portions of displacement shafts 7, 7 are respectively supported in the central portions of the trunnions 6, 6 and if the trunnions 6, 6 are swung about the pivot shafts 5, 5 respectively, the inclination angles of the displacement shafts 7, 7 can be adjusted freely. On the peripheries of the two displacement shafts 7, 7 supported on the two trunnions 6, 6, there are rotatably supported a plurality of power rollers 8, 8 respectively. The power rollers 8, 8 are respectively interposed between the inner surfaces 2a and 4a, opposed to each other, of the input-side disk 2 and the output-side disk 4. The inner surfaces 2a and 4a are formed as concave surfaces which can be obtained by rotating an arc having the pivot shaft 5 as a center thereof. And, the peripheral surfaces 8a, 8a of the power rollers 8, 8, which are formed as spherical-shaped convex surfaces are respectively in contact with the inner surfaces 2a and 4a.

Between the input shaft 1 and input-side disk 2, there is interposed a pressure device 9 of a loading cam type, while the input-side disk 2 is elastically pressed toward the output-side disk 4 by the pressure device 9. The pressure device 9 is composed of a cam plate 10 rotatable together with the input shaft 1, and a plurality of (for example, four pieces of) rollers 12, 12 which are respectively rollably held by a retainer 11.

On one side surface (in FIGS. 8 and 9, on the left side surface) of the cam plate 10, there is formed a drive-side cam face 13 being a curved surface which extends over the circumferential direction of the cam plate 10. And, on the outer surface (in FIGS. 8 and 9, on the right side surface) of the input-side disk 2, there is also formed a driven-side cam face 14 having a similar shape. The plurality of rollers 12, 12 are each rotatably supported about their respective shafts which extend in the radial direction with respect to the center of the input shaft 1.

The above-structured toroidal type continuously variable transmission operates in the following way. When the cam plate 10 is rotated with the rotation of the input shaft 1, the drive-side cam face 13 presses the plurality of rollers 12, 12 against the driven-side cam face 14 formed on the outer surface of the input-side disk 2. As a result of this, the input-side disk 2 is pressed against the plurality of power rollers 8, 8 and, at the same time the drive-side and driven-side cam faces 13 and 14 are pressed against the plurality of rollers 12, 12, so that the input-side disk 2 is rotated. The rotation of the input-side disk 2 is transmitted through the plurality of power rollers 8, 8 to the output-side disk 4, so that the output shaft 3 fastened to the output-side disk 4 is rotated.

Next, a description will be given of a case of changing of a rotational speed ratio (speed change ratio) of the input and output shafts 1 and 3. At first, when decelerating the rotational speed between the input shaft 1 and the output shaft 3, the trunnions 6, 6 are swung about the pivot shafts 5, 5 in a predetermined direction, respectively. Then, the displacement shafts 7, 7 are respectively inclined so that the peripheral surfaces 8a, 8a of the power rollers 8, 8, as shown in FIG. 8, can be respectively contacted with a near-center portion on the inner surface 2a of the input-side disk 2 and with a near-outer-periphery portion on the inner surface 4a of the output-side disk 4.

Also, on the other hand, when accelerating the rotational speed between the input and output shafts 1 and 3, the trunnions 6, 6 are respectively swung about the pivot shafts 5, 5 in the opposite direction to the predetermined direction. Then, the displacement shafts 7, 7 are respectively inclined so that the peripheral surfaces 8a, 8a of the power rollers 8, 8, as shown in FIG. 9, can be respectively contacted with a near-outer-periphery portion on the inner surface 2a of the input-side disk 2 and a near-center portion on the inner surface 4a of the output-side disk 4. When the inclination angles of the displacement shafts 7, 7 are set in the middle of the inclination angles shown in FIGS. 8 and 9, then there can be at obtained an intermediate transmission ratio between the input and output shafts 1 and 3.

A specific example of the toroidal type continuously variable transmission is shown in FIGS. 10 and 11. This transmission is disclosed in Japanese Utility Model Unexamined Publication No. Hei. 1-173552. As shown, an input-side disk 2 and an output-side disk 4 are rotatably supported around a cylindrical input shaft 15 with the aid of needle roller bearings 16, 16 inserted therebetween. As shown in FIGS. 12 to 14 in detail, each of the needle roller bearings 16, 16 is constructed with a plurality of needle rollers 54, 54 and cage-like window type retainers 55 for holding rollably those needle rollers 54, 54. In this case, the outer circumferential surface of the input shaft 15 serves as a cylindrical inner raceway 56 of the needle roller bearing 54, and the inner circumferential surfaces of the input-side and output-side disks 2, 4 serve as the outer raceway 57 of the needle roller bearing 54.

A cam plate 10 is spline engaged with the outer peripheral surface of the end portion (in FIG. 10, the left end portion) of the input shaft 15 and is prevented, by a flange portion 17, from moving in a direction away from the input-side disk 2.

Further the cam plate 10 and rollers 12, 12 constitute a pressure device 9 of a loading cam type. The pressure device 9, in accordance with the rotation of the input shaft 15, rotates the input-side disk 2 while it is pressing against the input-side disk 2 toward the output-side disk 4. An output gear 18 is coupled to the output-side disk 4 by means of keys 19, 19 so that the output-side disk 4 and the output gear 18 are synchronously rotated.

A pair of trunnions 6, 6, in particular, their respective two end portions thereof are supported on a pair of support plates 20, 20 in such a manner that they can be swung and can be displaced in the axial direction (in FIG. 10, in the front and back direction, or in FIG. 11, the horizontal directions) thereof. And, two displacement shafts 7, 7 are respectively supported in circular holes 23, 23 which are respectively formed in the middle portions of the pair of trunnions 6, 6. The two displacement shafts 7, 7 respectively include support shaft portions 21, 21 and pivot shaft portions 22, 22 which are extend in parallel to each other but are eccentric to each other. The support shaft portions 21, 21 are rotatably supported inside the circular holes 23, 23 through radial needle roller bearings 24, 24, respectively. Also, power rollers 8, 8 are rotatably supported in the peripheries of the pivotal support portions 22, 22 through another radial needle roller bearings 25, 25, respectively.

The pair of the displacement shafts 7, 7 are respectively disposed on 180 deg.-separated opposite sides with respect to the input shaft 15. Also, a direction, in which the pivot shaft portions 22, 22 of the displacement shafts 7, 7 are eccentric to the support shaft portions 21, 21, is set as the same direction with respect to the rotation direction of the input- and output-side disks 2 and 4 (in FIG. 11, horizontal inverse directions). Also, the eccentric direction is set almost at right angles to the direction in which the input shaft 15 is disposed. Therefore, the power rollers 8, 8 are supported in such a manner that they can be somewhat displaced in the disposing direction of the input shaft 15. As a result, when the component parts are elastically deformed by large loads imparted thereto in a transmission state of the rotational force, and as a result of the deformation, even if the power rollers 8, 8 are likely to displace in the axial direction of the input shaft 15 (in FIG. 10, horizontal direction, in FIG. 11, the front and back direction), this displacement of the power rollers 8, 8 may be absorbed without applying excessive force to the component parts.

Also, between the outer surfaces of the power rollers 8, 8 and the inner surfaces of the middle portions of the trunnions 6, 6, there are interposed thrust ball bearings 26, 26 and thrust needle roller bearings 27, 27 are disposed in this order from the outer surfaces of the power rollers 8. The thrust ball bearing 26, 26 are respectively used to allow the power rollers 8, 8 to rotate while supporting the load applied to the power rollers 8, 8 in the thrust direction. The thrust ball bearings 26, 26 are respectively composed of a plurality of balls 29, 29, annular-shaped retainers 28, 28 for rollably holding the balls 29, 29 therein, and annular-shaped outer races 30, 30. The inner raceways of the thrust ball bearings 26, 26 are respectively formed on the outer surfaces of the power rollers 8, 8, whereas the outer raceways thereof are respectively formed on the inner surfaces of the outer races 30, 30.

Each of the thrust needle roller bearings 27, 27 is composed of a race 31, a retainer 32 and needle rollers 33, 33. The race 31 and retainer 32 are combined together in such a manner that they can be somewhat displaced in the rotation direction which centers the support shaft portion 21. The thrust needle roller bearings 27, 27 interpose the races 31, 31 between the inner surfaces of the trunnions 6, 6 and the outer surfaces of the outer races 30, 30 in a state that the races 31, 31 are contacted with the inner surfaces of the trunnions 6, 6. The thrust needle roller bearings 27, 27 allow the pivot shaft portions 22, 22 and the outer races 30, 30 to swing about the support shaft portions 21, 21 while receiving a thrust load applied to the outer races 30, 30 from the power rollers 8, 8.

Drive rods 36, 36 are respectively coupled to one end portions (left end in FIG. 11) of the trunnions 6, 6. And, drive pistons 37, 37 are respectively firmly coupled to the outer surface of the middle position of the drive rods 36, 36. The drive pistons 37, 37 are oil-tightly disposed within drive cylinders 38, 38.

In the thus constructed toroidal type continuously variable transmission, a rotation of the input shaft 15 is transmitted to the input-side disk 2 through the pressure device 9. A rotation of the input-side disk 2 is transmitted through the pair of power rollers 8, 8 to the output-side disk 4, and a rotation of the output-side disk 4 is output from the output gear 18. To change the rotational speed change ratio between the input shaft 15 and the output gear 18, the pair of drive pistons 37, 37 are displaced in the opposite directions to each other. In accordance with the displacement of the drive pistons 37, 37, the pair of trunnions 6, 6 displace in the opposite directions, so that the lower power roller 8 disposed in the downside of FIG. 11 displaces to the right, while at the same time the upper power roller 8 disposed in the upside of FIG. 11 displaces to the left. Accordingly, the direction of forces in the tangential direction which act on contact positions where the peripheral surfaces 8a, 8a of the power rollers 8, 8 are in contact with the inner surface 2a of the input-side disk 2 and the inner surface 4a of the output-side disk 4, is changed. In accordance with the changing of the direction of the forces, the trunnions 6, 6 are swung about the pivot shafts 5, 5 which are supported by the support plates 20, 20 in the opposite directions to each other. As a result, as shown in FIGS. 8 and 9, the contact positions where the peripheral surfaces 8a, 8a of the power rollers 8, 8 are in contact with the inner surface 2a and the inner surface 4a of the input- and output-side disks 2 and 4 are shifted, whereby the rotational speed change ratio between the input shaft 15 and the output gear 18 is changed.

When the rotational force is transmitted between the input shaft 15 and the output gear 18, based on the elastic deformation of the component parts, the power rollers 8, 8 are displaced in the axial direction of the input shaft 15. As a result, the displacement shafts 7, 7 which pivotally support the power rollers 8 are slightly turned about the support shaft portions 21, 21, respectively. Due to the turning of the displacement shafts 7, 7, the outer surfaces of the outer races 30, 30 of the thrust ball bearings 26, 26 are displaced relative to the inner surfaces of the trunnions 6, 6. A force required for the relative displacement is small because the thrust needle roller bearings 27 are present between the outer surfaces of the races 30, 30 and the inner surfaces of the trunnions 6, 6. This fact implies that a force to change an inclination angle of each of the displacement shafts 7, 7 is small.

Turning now to FIGS. 15 and 16, there are shown toroidal type continuously variable transmissions increased in their transmissible torque. As shown, a couple of input-disks 2A and 2B and a couple of output disks 4, 4 are arranged side by side around an input shaft 15a in the power transmission direction. In either structure (FIGS. 15 and 16), an output gear 18a is disposed in a middle portion of the input shaft 15a to be rotatably supported around the input shaft 15a. The output disks 4,4 are spline-engaged to both ends of a cylindrical portion provided in the central portion of the output gear 18a. Needle roller bearings 16, 16 are respectively provided between the inner circumferential surfaces of the output disks 4, 4 and the outer circumferential surface of the input shaft 15a. With provision of the needle roller bearings 16, the output disks 4, 4 are supported around the input shaft 15a so as to be rotatable about the input shaft 15a and movable in the axial direction of the input shaft 15a. The input disks 2A and 2B are supported at both ends of the input shaft 15a while being rotatable together with the input shaft 15a. The input shaft 15a is rotatable driven by a drive shaft 51 through the pressure device 9 of the loading cam type. There is provided a radial bearing 52, such as a sliding bearing or a needle roller bearing, is disposed between the outer circumferential surface of the tip end (left end of in FIGS. 15 and 16) of the drive shaft 51 and the inner circumferential surface of the base end (right end in FIGS. 8 and 9) of the input shaft 15a. Therefore, the drive shaft 51 and the input shaft 15a are concentrically combined with each other such that those shafts are slightly movable in the rotational direction.

The rear surface of input-side disk 2A (located on the left side in FIGS. 15 and 16) is thrust against a loading nut 39 directly (in the structure shown in FIG. 16) or with a coned disk spring 45 having large resilience being interposed therebetween (in the structure shown in FIG. 15), to thereby substantially prevent the displacement of the input-side disk 2A in the axial directions (horizontal directions in FIGS. 15 and 16) of the input shaft 15a. On the other hand, the input-side disk 2B facing the cam plate 10 is supported to be movable in the axial direction of the input shaft 15a with the aid of a ball spline 40. A coned disk spring 41 and a thrust needle roller bearing 42 are serially disposed between the rear surface (right-side surface in FIGS. 15 and 16) of the input-side disk 2B and the front surface (left-side surface in FIGS. 15 and 16) of the cam plate 10. The coned disk spring 41 functions so as to impart pre-load to contact portions where the inner surfaces 2a of the input-side disks 2A and 2B and the inner surface 4a of the output-side disk 4 are in contact with the peripheral surfaces 8a, 8a of the power rollers 8, 8. The thrust needle roller bearing 42 allows the input-side disk 2B to rotate relative to the cam plate 10 when the pressure device 9 operates.

In the structure of FIG. 15, the output gear 18a is rotatably supported while the axial displacement thereof being prevented, on a partitioning wall 44 provided inside of the housing 53 (FIG. 11), by a pair of angular-type ball bearings 43, 43. In the structure of FIG. 16, the output gear 18a is axially displaceable. In the toroidal type continuously variable transmission of the double cavity type in which the couple of input-side disks 2A and 2B and the couple of output-side disks 4,4 are arranged side by side in the power transmission direction, as shown in FIGS. 15 and 16, one of the input-side disks 2A and 2B, which faces the cam plate 10 or both of them is or are axially movable with respect to the input shaft 15a by means of the ball spline 40, 40a. The reason for this is that the transmission structure is designed so as to allow the input-side disks 2A and 2B to displace in the axial directions of the input shaft 15a, while securing the synchronous rotations of the input-side disks 2A and 2B, based on the elastic deformation of the related component parts due to operations of the pressure device 9.

The ball spline 40 and ball spline 40a include inner-diameter ball-spline grooves 46 formed in the inner circumferential surfaces of the input-side disks 2A and 2B, outer-diameter ball-spline grooves 47 formed in the outer circumferential surfaces of the intermediate portion of the input shaft 15a, and a plurality of balls 48, 48 rollably provided between the inner-diameter ball-spline grooves 46 and the outer-diameter ball-spline grooves 47. As for the ball spline 40 for supporting the input-side disk 2B located closer to the pressure device 9, a stopper ring 50 is retained in a stopper groove 49 formed in a portion of the inner circumferential surface of the input-side disk 2B, which is closer to the inner surface 2a thereof, to thereby limit the balls 48, 48 in displacing toward the inner surface 2a of the input-side disk 2B. Further, it prevents the balls 48, 48 from slipping off from between the inner-diameter ball-spline grooves 46 and the outer-diameter ball-spline grooves 47. As for the ball spline 40a for supporting the input-side disk 2A located apart from the pressure device 9 in the transmission structure of FIG. 15, a stopper ring 50a is retained in a stopper groove 49a formed in the outer circumferential surface (a portion thereof closer to the left end in FIG. 15) of the input shaft 15a, to thereby limiting the balls 48, 48 in displacing toward the inner surface 2a of the input-side disk 2A.

Also, as shown in FIG. 10, in the respective central portions of the input and output-side disks 2 and 4, there are formed center holes 58 and 58 each having a circular section shape in such a manner that they each extend through the inner surfaces and the outer surfaces of the disks 2 and 4 in the axial direction of the disks 2 and 4 (in FIG. 10, in the right and left direction). And, the needle roller bearings 16 and 16 are interposed between the inner peripheral surfaces of the center holes 58, 58 and the outer peripheral surfaces of the intermediate portions of the input shaft 15, respectively. Also, snap rings 62 and 62 each are secured into their associated stopper grooves 61 and 61 which are respectively formed in the inner peripheral surfaces of the portions of the ends of the center holes 58 and 58 that are situated near to the inner surfaces sides thereof, thereby preventing the needle roller bearings 16 and 16 from slipping out from their associated center holes 58 and 58 to the inner surfaces 2a, 4a sides of the input and output-side disks 2 and 4.

Now, FIGS. 23 and 24 each show an output-side disk 4 to be incorporated into the toroidal-type continuously variable transmission shown in FIGS. 10 and 11 which is structured and operates in the above-mentioned manner. Referring in detail to the structure of the output-side disk 4, in the center hole 58 formed in the central portion of the output-side disk 4, there are formed a cylindrical surface portion 63, a spline portion 64, an outer race raceway portion 65 and a second cylindrical surface portion 66 sequentially in this order from the outer surface side (in FIGS. 23 and 24, the right side) of the output-side disk 4. Of these portions, the cylindrical surface portion 63 corresponds to a fitting portion: that is, the cylindrical surface portion 63 can be tightly fitted with part of a sleeve 67 (FIG. 10) fixedly secured to the inner peripheral edge portion of an output gear 18 which can be rotated together with the output-side disk 4, thereby making the sleeve 67 and output-side disk 4 concentrical with each other. In the case where the keys 19 and 19 are used, they are laid over between the cylindrical surface portion 63 and sleeve 67. However, when the sleeve 67 and output-side disk 4 are spline engaged together, the keys 19 and 19 are not necessary. On the other hand, when the keys 19 and 19 are disposed, instead of the spline portion, there is formed a key groove. When the spline portion 64 is employed, the spline portion 64 is engaged with a male spline portion formed in the outer peripheral surface of part of the sleeve 67 to thereby prevent the relative rotation between the sleeve 67 and output put disk 4. By the way, the structure used to prevent the relative rotation between the sleeve 67 and output put disk 4 is not limited to the spline engagement or key engagement, but there can also be employed other engaging structures such as a structure in which the sleeve 67 and output put disk 4 are engaged together in an axially concave-convex manner, and the like. Also, a stopper groove 61 for securing the snap ring 62 (FIG. 10) is formed between the outer race raceway portion 65 and second cylindrical portion 66. In the output-side disk 4 having the above-mentioned shape (further, if the need arises, in the inner peripheral surface of the input-side disk 2), preferably, a residual compressive stress layer may be formed by shot peening. The reason for this will be explained below in detail with reference to FIGS. 25 to 27.

When the toroidal-type continuously variable transmission is in operation, the peripheral surfaces 8a, 8a of the power rollers 8, 8 and the inner surfaces 2a, 4a of the input and output-side disks 2, 4 are strongly contacted with each other due to the operation of the pressure device 9. That is, strong forces each are applied to the contact portions between the surfaces 8a and surfaces 2a, 4a in directions each shown by arrow marks in FIG. 25 in the case of deceleration and in directions each shown by arrow marks in FIG. 26 in the case of acceleration. And, due to such strong forces, the input and output-side disks 2 and 4 are deformed elastically, respectively. For example, in the case of the decelerating operation shown in FIG. 25, the two portions of the output-side disk 4, which are located at two mutually opposite positions in the diameter direction thereof and are situated near to the outside diameter thereof, are pressed strongly in the thrust direction thereof. As a result of this, the output-side disk 4 is deformed elastically from its state shown by a solid line in FIG. 27 to its another state shown by a two-dot chained line in FIG. 27. When the output-side disk 4 is elastically deformed in this manner, a tensile stress is applied to the center hole 58 formed in the central portion of the output-side disk 4, especially, to the second cylindrical surface 66 portion thereof that is situated near to the inner surface 4a of the output-side disk 4.

Such tensile stress is applied repeatedly as the output-side disk 4 is rotated and, therefore, unless any countermeasure is taken, then it is difficult to secure the durability of the output-side disk 4; for example, the second cylindrical surface 66 portion thereof is easy to cause cracks. In view of this, if a residual compressive stress layer by shot peening is formed in the second cylindrical surface 66 portion, which is the near-to-inner-surface 4a portion of the inner peripheral surface of the output-side disk 4, then it can be made difficult to cause cracks in the second cylindrical surface 66 portion in spite of the repeatedly applied tensile stresses.

Further, in the conventional toroidal-type continuously variable transmission which is structured and operates in the above-mentioned manner, the needle roller bearings 16 and 16, which are used to support their associated output-side disks 4, 4 in the peripheries of their associated input shafts 15, 15a in such a manner the output-side disks 4, 4 can be freely rotated as well as can be freely shifted in the axial direction thereof, are not always sufficient in the durability thereof. A description will be given below in detail of the reason why the needle roller bearings 16 and 16 are not always be able to provide sufficient durability.

When the toroidal-type continuously variable transmission is used as a transmission unit of a transmission for an automobile, power transmitted from an engine to the input shafts 15, 15a is transmitted from the input-side disks 2, 2A, 2B to the output disk 4, 4 through their respective power rollers 8 and 8. Here, referring to the traction portions which are used to transmit the power between the power rollers 8, 8 and output-side disks 4, 4, that is, the contact portions between the inner surfaces 4a, 4a of the output-side disks 4, 4 and the peripheral surfaces 8a, 8a of the power rollers 8, 8 are present at a plurality of positions which are spaced at regular intervals in the circumferential direction thereof. Therefore, the radial components of the loads applied to the respective inner surfaces 4a, 4a of the output-side disks 4, 4 in accordance with the above-mentioned power transmission are cancelled in the inside portions of their associated output-side disks 4, 4, respectively. As a result of this, the radial loads applied to the respective needle roller bearings 16, 16 are only the weights of the respective output-side disks 4, 4 and the output gears 18, 18a connected and fixed to these output-side disks 4, 4.

On the other hand, of the respective needle roller bearings 16, 16, the operating speeds of the needle roller bearings 16, 16 for supporting the respective output-side disks 4, 4 provide the relative rotation speeds between these output-side disks 4, 4 and the input shafts 15, 15a. Since the rotation directions of the output-side disks 4, 4 and input shafts 15, 15a are opposite to each other, for example, in the case in which the rotation speed of the input shafts 15, 15a is 4000 r.p.m. and the change gear ratio is 1, the operating speed of the needle roller bearings 16, 16 is 8000 r.p.m. (=4000 r.p.m.+4000 r.p.m.). Also, in the case in which a deceleration ratio is 0.5 (that is, the speed is increased up to double), the operating speed of the needle roller bearings 16, 16 is 12000 r.p.m. (=4000 r.p.m.+8000 r.p.m.) and, similarly, for an acceleration ratio of 2 (that is, the speed is decreased down to one half), the operating speed of the needle roller bearings 16, 16 is 6000 r.p.m. (=4000 r.p.m.+2000 r.p.m.).

When the loads applied to the needle roller bearings 16, 16 correspond substantially to the above-mentioned weights, even if the operating speeds are in the above-mentioned level, then there arises no problem as to the rolling fatigue lives of these needle roller bearings 16, 16. However, according to an endurance or durability experiment conducted by the present inventors, when the input torques (that is, the drive torques of the input shafts 15, 15a) are large, and the toroidal-type continuously variable transmission is operated for a long time while the change gear condition between the input-side disks 2, 2A and output-side disks 4, 4 remains in the deceleration state, then it is found that there occurs early exfoliation in the needle roller bearings 16, 16 interposed between the inner peripheral surfaces of the output-side disks 4, 4 and the outer peripheral surfaces of the input shafts 15, 15a.

The present inventors et al. have studied the cause of such early exfoliation and found that such early exfoliation is caused by the repeated elastic deformation of the output-side disks 4, 4. That is, in a structure in which two power rollers 8 and 8 are disposed in each cavity, the inner surfaces 4a, 4a of the output-side disks 4, 4 are contacted with the peripheral surfaces 8a, 8a of the power rollers 8, 8 at two mutually opposite positions in the circumferential direction thereof. And, such two positions are pressed strongly in the axial direction of the output-side disks 4, 4 by the large thrust loads that are generated by the pressure device 9 when the power transmission is carried out. As a result of this, the output-side disks 4, 4 each are deformed elastically. Especially, as shown in FIGS. 17 and 18, in a state in which, in order to achieve deceleration between the input-side disks 2, 2A, 2B and output-side disks 4, 4, the peripheral surfaces 8a, 8a of the power rollers 8, 8 are contacted with the portions of the inner surfaces 4a, 4a of the output-side disks 4, 4 that are situated near to the outside diameters thereof, as shown by arrow marks in FIG. 19, large moments are applied to the output-side disks 4, 4 respectively.

Thus, the output-side disks 4, 4, as shown exaggeratedly in FIGS. 19 to 21, are each elastically deformed to a great extent with the needle roller bearings 16, 16 as the fulcrums thereof. The deformation amount of the elastic deformation occurring in this mechanism is large on the inside diameter sides of the output-side disks 4, 4; and, it is outstandingly large especially in the small diameter end portion thereof (that is, the inner surfaces 4a side open end portion) which is formed small in thickness. And, the section of each of the center holes 58 of the output-side disks 4, 4 provides an elliptical shape in which the direction of a straight line connecting the above-mentioned two positions is the direction of a major diameter thereof. Accordingly, a portion, which is shifted by 90° in position with respect to the major diameter direction in the circumferential direction of the center hole 58, provides the minor diameter direction of the present elliptical shape; and, therefore, the distances between outer race raceways 57 formed by the inner peripheral surfaces of the center holes 58 of the output-side disks 4, 4 and inner races raceways 56 formed in the outer peripheral surfaces of the input shafts 15, 15a are shortened respectively. Also, the distance between the two raceways 57 and 56, as shown exaggeratedly in FIG. 22, is uneven in the axial direction of the output-side disk 4. That is, the distance is narrowed in the portion that is near to the inner surfaces 4a, 4a of the output-side disks 4, 4 (in FIG. 22, the left portion). And, in the portions where the distance between the two raceways 57 and 56 is narrowed, the needle rollers 54, 54 forming the needle roller bearings 16, 16 are to be strongly pressed and crushed between the inner race raceways 56 and outer race raceways 57. As a result of this, an excessive surface pressure due to an edge load is applied to the portions that are part of the inner race raceways 56 and outer race raceways 57 and are opposed to the end portions of the rolling surfaces of the needle rollers 54, 54 in the axial direction thereof, to thereby cause the damage of the present portions such as the early exfoliation and the like.

Such damage makes greater the sounds and vibrations that are generated in the needle roller bearing 16 portion, with the result that sounds and vibrations generated not only in a toroidal-type continuously variable transmission incorporating such needle roller bearing 16 but also in the whole of the transmission incorporating such toroidal-type continuously variable transmission are made to become greater. This has an ill influence on the comfortable riding feeling of a car carrying such transmission. Also, if tiny pieces produced due to the exfoliated raceway surfaces are involved into the transmission portion which transmits the power, the surface pressure of the present transmission portion becomes excessively large, which causes the damage such as early exfoliation and the like in the inner surfaces 2a, 4a of the input and output-side disks 2, 2A, 2B, 4, the peripheral surfaces 8a, 8a of the power rollers 8, 8 which form the transmission portion.

Also, when the residual compressive stress layer for prevention of occurrence of cracks is formed in the second cylindrical surface portion 66, a shot peening operation is executed also on the outer race raceway portion 65 adjoining the present second cylindrical surface portion 66, which deteriorates the surface roughness of the outer race raceway portion 65. As a result of this, the needle roller bearing 16 (FIG. 3) forming the present outer race raceway portion 65 is impaired in the durability thereof. If a masking operation is carried out on the outer race raceway portion 65 when the shot peening operation is executed on the second cylindrical surface portion 66, then it is possible to prevent the surface roughness of the outer race raceway portion 65 from worsening but, actually, it is very difficult to carry out an effective masking operation on the outer race raceway portion 65 that is formed in the deep portion of the center hole 58.

SUMMARY OF THE INVENTION

Accordingly, it is an object of the invention to provide a toroidal-type continuously variable transmission which can eliminate the drawbacks found in the above-mentioned conventional toroidal-type continuously variable transmissions.

To attain the above object, according to a first aspect of the invention, there is provided a toroidal-type continuously variable transmission, having: a rotatable input shaft; an input-side disk formed concentrical with the input shaft and rotatably supported in conjunction with the input shaft, the input-side disk including an inside surface being a concave surface formed in an arc-shaped section; an output-side disk rotatable with respect to the input shaft and including an inside surface opposed to the inside surface of the input-side disk, the inside surface being a concave surface formed in an arc-shaped section; a plurality of trunnions each swingable about their associated pivot shafts situated at a torsional relation with respect to the input shaft; a plurality of displacement shafts each supported in the intermediate portions of the plurality of trunnions in such a manner that the displacement shafts project from the inside surfaces of the trunnions; a plurality of power rollers each including a peripheral surface formed in a spherical-shaped convex surface, the power roller each being rotatably supported in the peripheries of the displacement shafts in such a manner that the power rollers are disposed on the inner surfaces of the plurality of trunnions and are interposed between the input-side and output-side disks; and, a radial needle roller bearing rotatably supporting the output-side disk on the input shaft. The radial needle roller bearing includes a plurality of needle rollers. The two end portions of each of the needle rollers in the axial direction thereof are crowned, and the crowning amount is set such that, in the portion of the needle roller that is situated by 7–13% of the axial-direction length toward the axial-direction central portion of the needle roller from the axial-direction end face of the needle roller, the crowning amount is 0.1–0.4% of the outside diameter of the axial-direction central portion of the needle roller.

The above-structured toroidal-type continuously variable transmission according to the first aspect of the invention, in accordance with a similar operation to be performed by the previously described conventional toroidal-type continuously variable transmission, transmits a rotation force between the input-side disk and output-side disk and further, by changing the inclination angles of the trunnions, changes a rotation speed ratio between these two disks.

Especially, in the case of the toroidal-type continuously variable transmission according to the first aspect of the invention, since a proper amount of crowning is executed on the respective needle rollers constructing the needle roller bearings for rotatably supporting the output-side disk, it is possible to prevent an excessive surface pressure from being applied to the components of the needle roller bearings in spite of the elastically deformed condition of the output-side disk.

Further, according to a second aspect of the invention, there is provided a toroidal-type continuously variable transmission, having: an input-side disk and an output-side disk formed concentrically with each other and supported so as to be rotatable independently of each other, the input and output-side disks including their respective inner surfaces opposed to each other, each of the inner surfaces being a concave surface having an arc-shaped section; a rotary shaft inserted through inside portions of the input and output-side disks; a plurality of trunnions each swingable about their associated pivot shafts situated at a torsional relation with respect to the rotary shaft; a plurality of displacement shafts supported on the trunnions, respectively; a plurality of power rollers each including a peripheral surface formed in a spherical-shaped convex surface, the power roller each being rotatably supported on the displacement shaft and interposed between the respective inner surfaces of the input side and output-side disks; and, a needle roller bearing interposed between an inner peripheral surface of at least one of the input and output-side disks and an outer peripheral surface of the rotary shaft. In the inner peripheral surface of at least one of the input and output-side disks, there are formed a fitting portion to be fitted outside with a member rotatable in conjunction with the disk and an outer race raceway portion for the needle roller bearing. At least in the portion of the inner peripheral surface of the disk that is situated near to the inside surface of the disk, there is formed a residual compressive stress layer by shot peening. And, the outer race raceway portion is ground so as to remove at least a portion of the residual compressive stress layer, to thereby form the outer race raceway portion as a smooth surface.

An operation to transmit a rotation force between the input-side disk and output-side disk and an operation to change a change gear ratio between these input and output-side disks, which are executed by the above-structured toroidal-type continuously variable transmission according to the second aspect of the invention, are similar to the operations that are executed by the conventional toroidal-type continuously variable transmission.

Especially, in the case of the toroidal-type continuously variable transmission according to the second aspect of the invention, since the residual compressive stress layer is formed in the inner peripheral surface portion in which the fitting portion and outer race raceway are formed, the durability of the above disk can be secured in spite of the tensile stress repeatedly applied to the inner peripheral portion due to the large thrust loads applied from the power rollers.

Further, because the outer race raceway portion is formed as a smooth surface, the durability of the needle roller bearing including the outer race raceway portion can be secured as well.

BRIEF DESCRIPTION OF THE DRAWINGS

FIG. 1 is a section view of the main portions of an output-side disk, showing a state thereof in which it is elastically deformed;

FIG. 12 is similar to FIG. 1;

DETAILED DESCRIPTION OF THE PREFERRED EMBODIMENTS

[First Embodiment]

Figure 1:
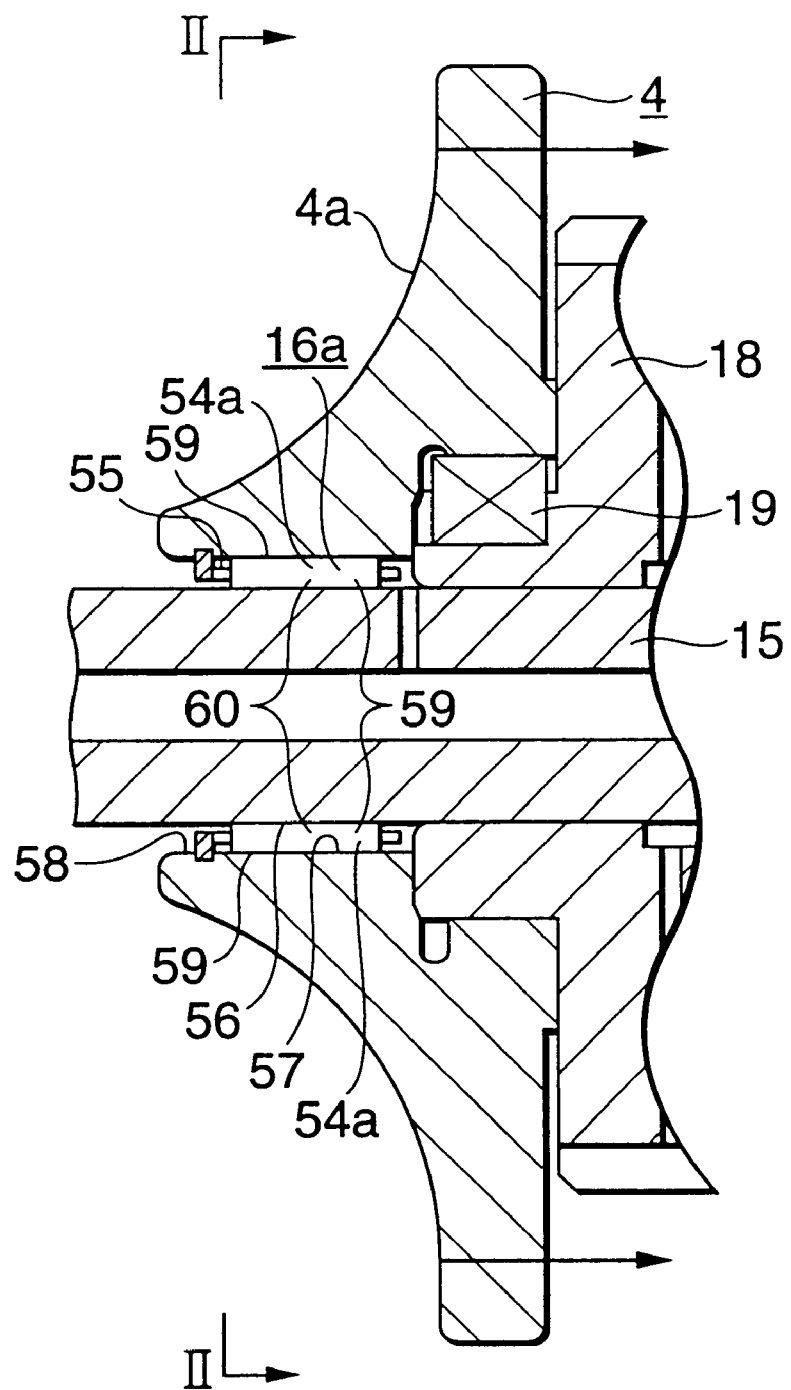
FIG. 1 is an explanatory view of an embodiment of a toroidal-type continuously variable transmission according to the invention; in particular.
Figure 2:
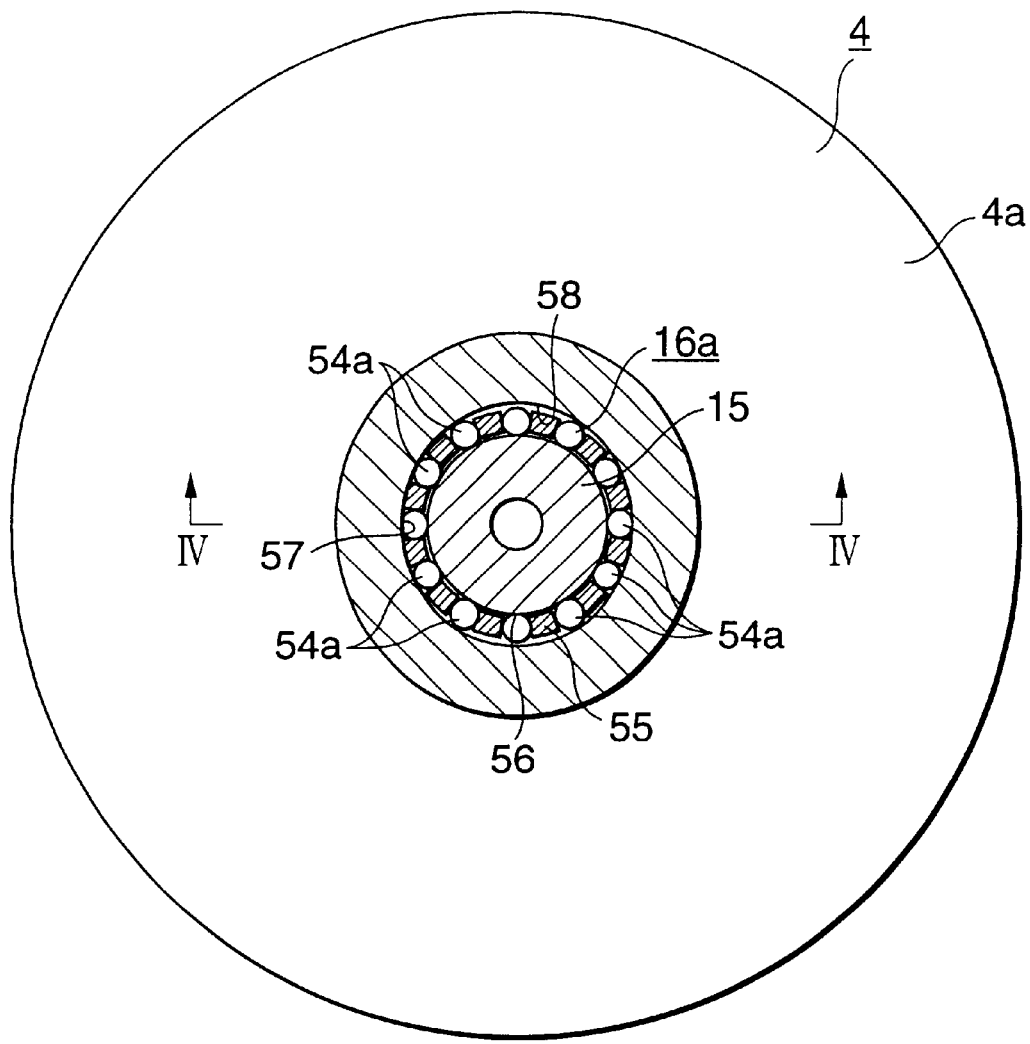
FIG. 2 is a section view taken along the line II—II shown in FIG. 1.
Figure 3:
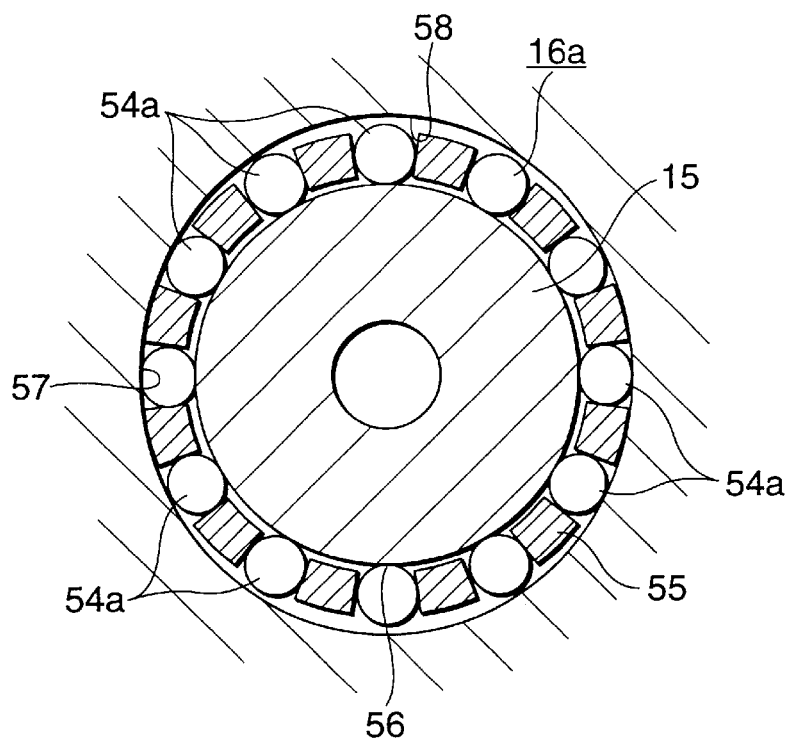
FIG. 3 is an enlarged view of the central portion of FIG. 2.
Figure 4:
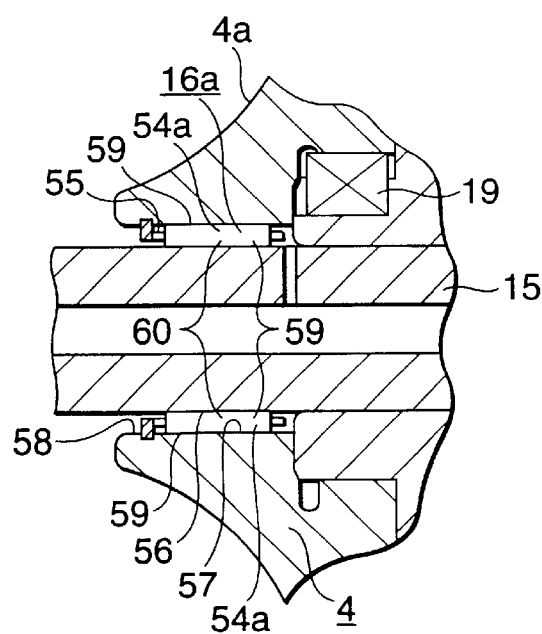
FIG. 4 is a section view taken along the line IV—IV shown in FIG. 2.

Now, FIGS. 1 to 5 each show a first embodiment of a toroidal-type continuously variable transmission according to the invention. By the way, the present invention is characterized by the needle roller bearing 16a portion for rotatably supporting the output-side disk 4 in the periphery of the intermediate portion of the input shaft 15. The structures and operations of the other portions of the invention than the present needle roller bearing 16a portion are similar to those of the previously described conventional toroidal-type continuously variable transmission and, therefore, duplicate illustration and description are omitted or simplified here. Thus, a description will be given below mainly of the characteristic portion of the invention.

The needle roller bearing 16a, similarly to the needle roller bearing incorporated into the previously described conventional toroidal-type continuously variable transmission, comprises a plurality of needle rollers 54a, 54a, and a cage-like window type retainer 55 which is used to rollably support these needle rollers 54a, 54a. And, the outer peripheral surface of the intermediate portion of the input shaft 15 is formed as a cylindrical-shaped inner race raceway 56, and the inner peripheral surface of a center hole 58 formed in the output-side disk 4 is formed as an outer race raceway 57.

Figure 5:
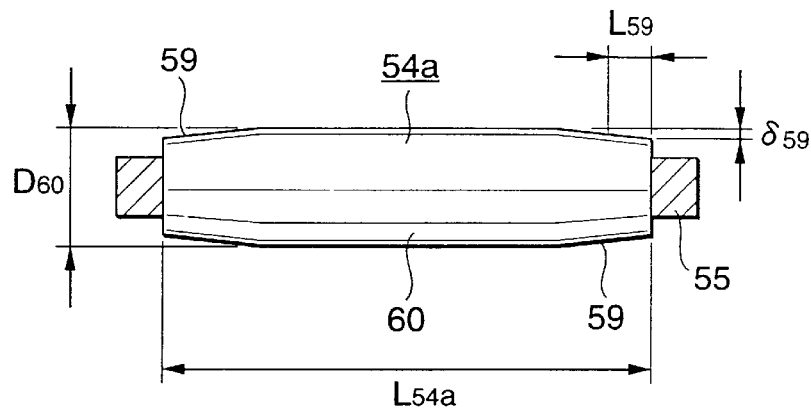
FIG. 5 is a partially enlarged section view of a needle roller bearing.

Especially, in the case of a toroidal-type continuously variable transmission according to the invention, as shown in detail in FIG. 5, the two end portions of each of the plurality of needle rollers 54a, 54a in the axial direction thereof are crowned to thereby form crownings 59 and 59. The crowning amount $\delta_{59}$ of each of these needle rollers 54a, 54a, that is, a distance, over which each of the outer peripheral surfaces of the respective crownings 59 and 59 is shifted inwardly in the diameter direction of the needle roller from its inherent (when it is assumed that the cylindrical portion 60 of the central portion in the axial direction thereof is extended as it is) cylindrical surface, is restricted in the following manner. At first, as a precondition, the length of each of the needle rollers 54a, 54a in the axial direction thereof is expressed as $L_{54a}$, the outside diameter of the cylindrical portion 60 is expressed as $D_{60}$, and the distance from the end face of each of the needle rollers 54a, 54a to the measured position of the above-mentioned crowning amount $\delta_{59}$ is expressed as $L_{59}$. And, the distance $L_{59}$ to the measured position is set in the range of 7–13% of the above-mentioned axial length $L_{54a}$ {that is, $L_{59}$=(0.07–0.13) $L_{54a}$}. Under these conditions, the crowning amount $\delta_{59}$ is set in the range of 0.1–0.4% of the outside diameter $D_{60}$ of the cylindrical portion 60 {$\delta_{59}$=(0.001 –0.004) $D_{60}$}.

As described above, in the toroidal-type continuously variable transmission according to the invention, the crownings 59, 59 are each formed in a proper amount in their associated needle rollers 54a, 54a forming the needle roller bearing 16a which is used to rotatably support the output-side disk 4 in the intermediate portion of the input shaft 15. Thanks to this, in spite of the fact that the distance between the inner race raceway 56 and outer race raceway 57 forming the needle roller bearing 16a is made uneven due to the elastic deformation of the output-side disk 4 caused by the large load that is generated when the toroidal-type continuously variable transmission is in operation, it is possible to prevent an excessive surface pressure from being applied to the composing parts of the needle roller bearing 16a.

That is, when the toroidal-type continuously variable transmission is in operation, the output-side disk 4 is elastically deformed in such an exaggerated manner as in FIGS. 1 to 4 due to the large loads that are applied to the two mutually opposite positions in the diameter direction of the output-side disk 4 from the peripheral surfaces 8a, 8a of the power rollers 8, 8 (FIGS. 8 to 11, FIGS. 15 to 18). Even when the output-side disk 4 is elastically deformed in this manner and the distance between the inner race raceway 56 and outer race raceway 57 is thereby made uneven, the axial end portions of the respective needle rollers 54a, 54a are prevented from being contacted with the inner race raceway 56 and outer race raceway 57, which makes it possible to prevent occurrence of early exfoliation due to an edge load.

As described above, according to the invention, by forming the proper crownings 59, 59 in the two axial end portions of the respective needle rollers 54a, 54a forming the needle roller bearing 16a, the occurrence of the edge load can be prevented, which in turn makes it possible to enhance the durability of the needle roller bearing 16a. That is, according to the invention, due to formation of the proper amounts of crownings 59, 59 in the respective needle rollers 54a, 54a, if the outer race raceway 57 formed by the inner peripheral surface of the power roller 8 is deformed elastically, the needle rollers 54a, 54a held by the retainer 55 are caused to change their respective attitudes to some degree, so that the rolling surfaces of the respective needle rollers 54a, 54a are allowed to follow the outer race raceway 57 and inner race raceway 56. Due to this, the contact conditions between the rolling surfaces of the respective needle rollers 54a, 54a and the inner race raceway 56 and outer race raceway 57 are each adjusted to a proper contact condition, thereby being able to prevent the surface pressures of the contact portions from rising excessively.

When the crowning amounts $\delta_{59}$ of the crownings 59, 59 formed in the two axial end portions of the respective needle rollers 54a, 54a are too small, occurrence of an edge load cannot be prevented sufficiently and, therefore, the durability of the needle roller bearing 16a cannot be enhanced sufficiently. On the other hand, when the crowning amounts $\delta_{59}$ of the crownings 59, 59 are excessively large, the needle rollers 54a, 54a forming the needle roller bearing 16a as well as the power roller 8 supported by the needle roller bearing 16a are each caused to incline, with the result that an edge load is easy to occur and thus damage such as early exfoliation and the like can be easily incurred. In addition to this, since the output-side disk 4 is rotated at a high speed to transmit the power while it is inclined with respect to its inherent position, sounds and vibrations to be generated when the toroidal-type continuously variable transmission is in operation are caused to increase. As a result of this, a transmission unit formed by the present toroidal-type continuously variable transmission as well as the whole of a transmission including such transmission unit generate large sounds and vibrations, which has an ill influence on the comfortable riding feeling of a car carrying the present transmission.

On the other hand, according to the present invention, because the crowning amount $\delta_{59}$ is restricted to the above-mentioned range, not only occurrence of an edge load can be prevented effectively but also it is possible to prevent the power roller 8 from being inclined when the toroidal-type continuously variable transmission is in operation.

Next, a description will be given below of an experiment conducted by the present inventors in order to restrict the above-mentioned crowning amount $\delta_{59}$ to the above-mentioned range. In the experiment, a deceleration durability test using a motor dynamo has been conducted on two types of toroidal-type continuously variable transmissions, that is, a large type of toroidal-type continuously variable transmission and a small type of toroidal-type continuously variable transmission.

As the large type of toroidal-type continuously variable transmission, there was used a double cavity type of toroidal-type continuously variable transmission having a cavity diameter $D_0$ (that is, a distance between the center axes of pivot shafts 5 and 5 each disposed in the two end portions of the trunnions 6, 6. See FIG. 11) of 130 mm. As operating conditions in this experiment, there were used the following conditions: that is, the rotation speed of the input-side disks 2A and 2B is 4000 r.p.m., an input torque is 300 Nm, and a deceleration ratio is 2.0 (that is, the rotation speed of the output-side disk 4 is one half of the rotation speed of the input-side disks 2A, 2B). Also, the dimensions of the needle roller bearing 16a were set as follows: that is, the diameter of the inscribed circles of the respective needle rollers 54a, 54a is 28 mm, the diameter of the circumscribed circles thereof is 36 mm (the outside diameter of the cylindrical portions of the respective needle rollers 54a=4 mm), and the axial length thereof $L_{54a}$ is 7.8 mm.

Under the above-mentioned conditions, the experiment on the durability of the needle roller bearing 16a as conducted by changing the crowning amounts $\delta_{59}$ of the respective needle rollers 54a in a various manner (with the crowning amount $\delta_{59}$ as a parameter), whereby proper values as the crowning amounts $\delta_{59}$ were obtained. By the way, prior to execution of this deceleration durability test, based on the intensity of the load applied to the output-side disk 4 from the power rollers 8, 8 when the toroidal-type continuously variable transmission is in operation, the deforming amount of the output-side disk 4 was found according to the FEM calculation, and the thus found deforming amount was reflected on the crowning amounts $\delta_{59}$. Also, the target time of the deceleration durability experiment or test was set for 20 hours. This value of 20 hours is a numeric value which provides a reference for the durability as the life of the change gear unit of a transmission for a car.

Figure 6:
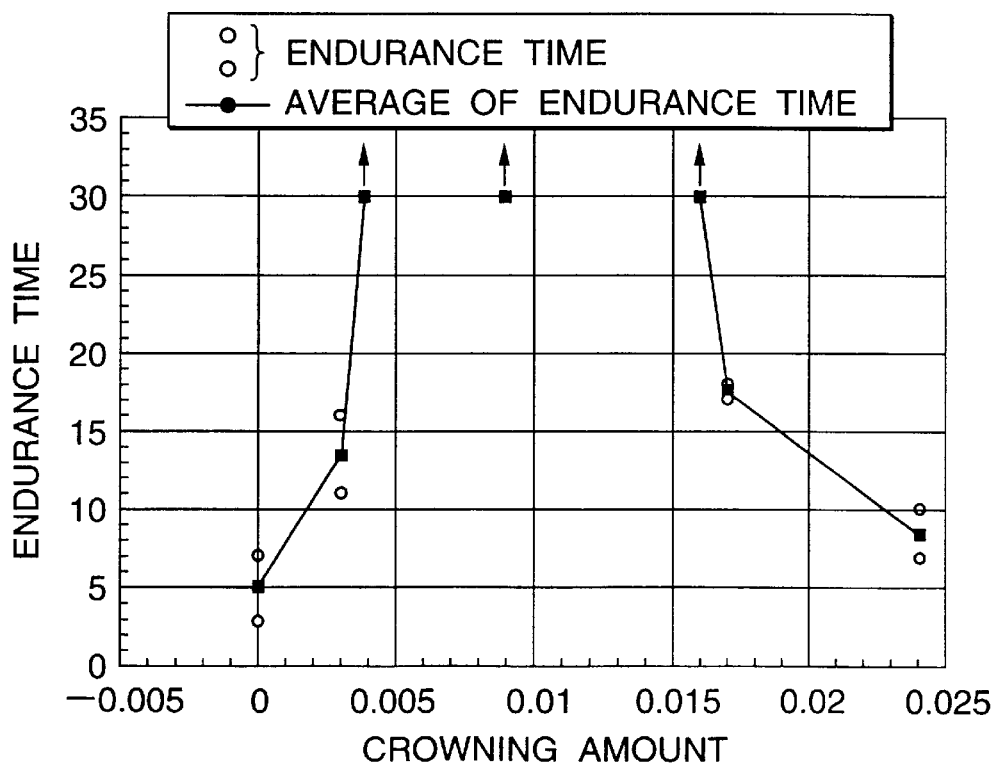
FIG. 6 is a graphical representation of the results of a first experiment conducted in order to obtain the relationship between a crowning amount and the durability of a radial needle roller bearing.

The results of the deceleration durability experiment conducted in this manner are as shown in Table 1 and FIG. 6.

TABLE 1

| Experiment Nos. | Crowning amount $\delta_{59}$ at a position distance 0.8 mm from the end of the needle roller | Test results |
|---|---|---|
| A | No crowning | Rollers and shafts of needle roller bearing exfoliated in 3 and 7 hours, respectively. |
| B | 0.003 mm | Rollers and shafts of needle roller bearing exfoliated in 11 and 16 hours, respectively. |
| C | 0.004 mm | Test exceeded target time of 20 hours and terminated after 30 hours. Test was conducted twice. |
| D | 0.009 mm | Test exceeded target time of 20 hours and terminated after 30 hours. Test was conducted twice. |
| E | 0.016 mm | Test exceeded target time of 20 hours and terminated after 30 hours. Test was conducted twice. |
| F | 0.017 mm | Rollers and shafts of needle roller bearing were exfoliated in 18 and 17 hours, respectively. |
| G | 0.024 mm | Rollers and shafts of needle roller bearing were exfoliated in 10 and 7 hours, respectively. Sounds and vibrations were large. |

TABLE 1-continued

Also, a similar deceleration durability experiment was conducted on a small single cavity type of toroidal-type continuously variable transmission having a cavity diameter $D_0$ of 104 mm as well. In this case, the rotation speed of the input-side disk 2 was set for 4000 r.p.m., the input torque was set for 60 Nm, and a deceleration ratio was set for 2.0. And, the dimensions of the needle roller bearing 16a were set in the following manner: that is, the diameter of the inscribed circles of the respective needle rollers 54a, 54a was 20 mm, the diameter of the circumscribed circles thereof was 26 mm (the outside diameter of the cylindrical portions 60 of the respective needle rollers 54a=3 mm), and the axial length thereof $L_{54a}$ was 13.8 mm. By the way, the reason why the small type of toroidal-type continuously variable transmission is larger in the axial length than the large type of toroidal-type continuously variable transmission is that, in the large type of toroidal-type continuously variable transmission, due to presence of the spline portions and faucet fitting portions which are each formed in the connecting portions between the output gear 18a and output-side disks 4, 4, the length of the respective needle roller bearings 16a cannot be set large.

Figure 7:
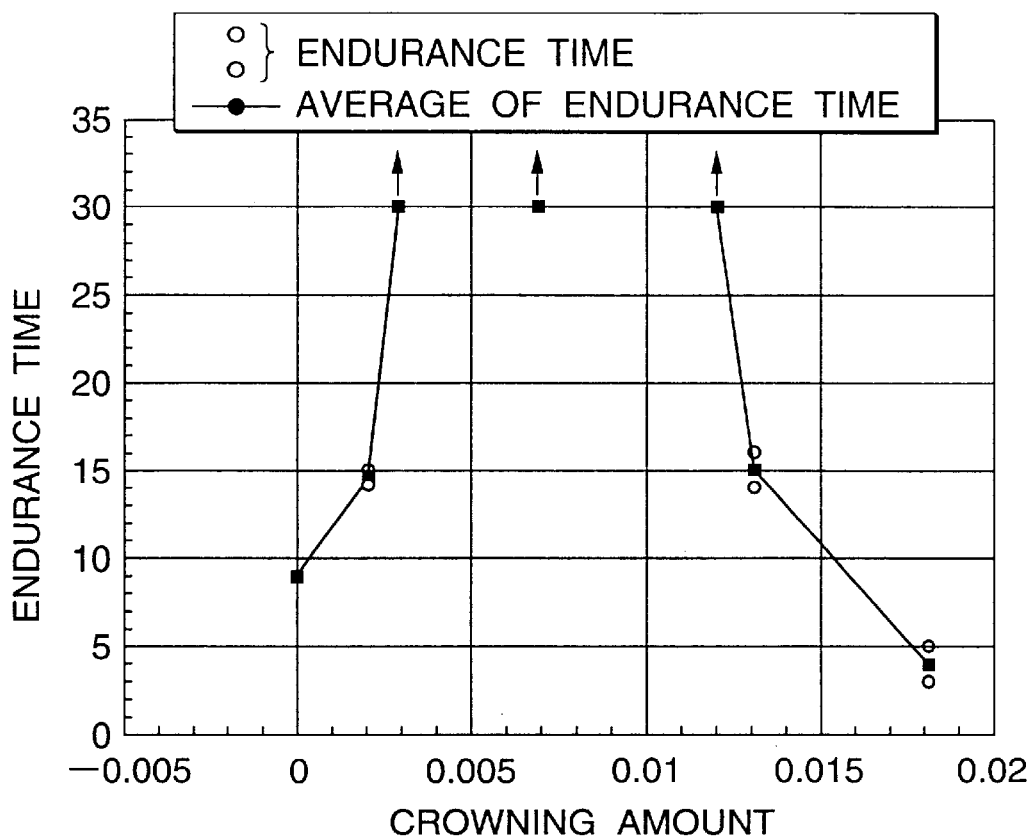
FIG. 7 is a graphical representation of the results of a second experiment conducted similarly to FIG. 6.
Figure 8:
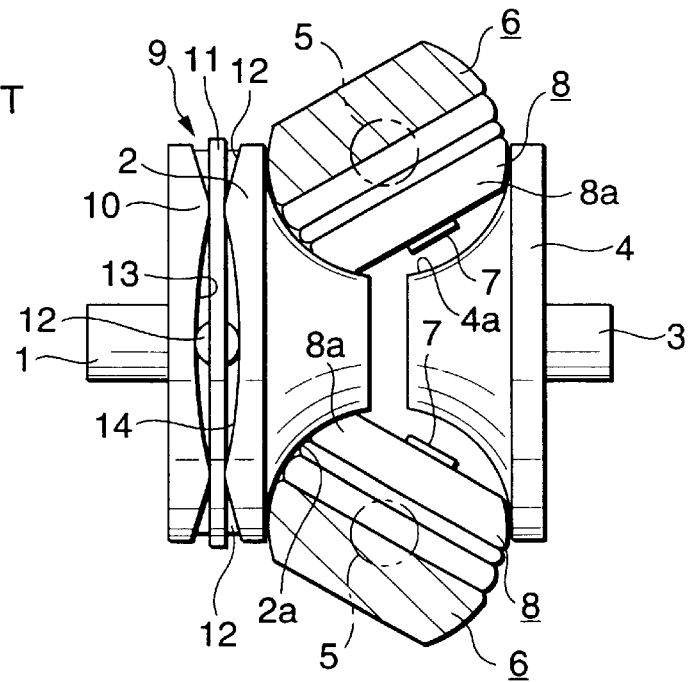
FIG. 8 is a side view of the basic structure of a conventional toroidal-type continuously variable transmission, showing a state thereof in the maximum deceleration.
Figure 9:
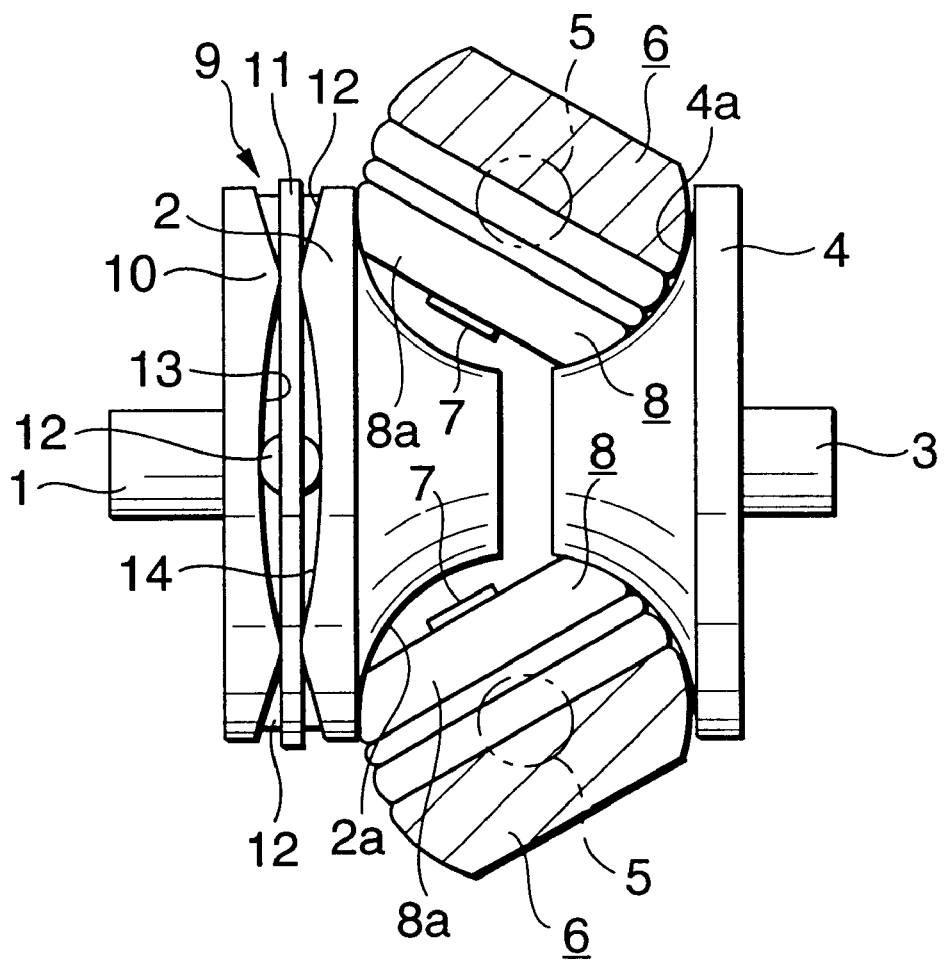
FIG. 9 is a side view of the above-mentioned conventional structure, showing a state thereof in the maximum acceleration.
Figure 10:
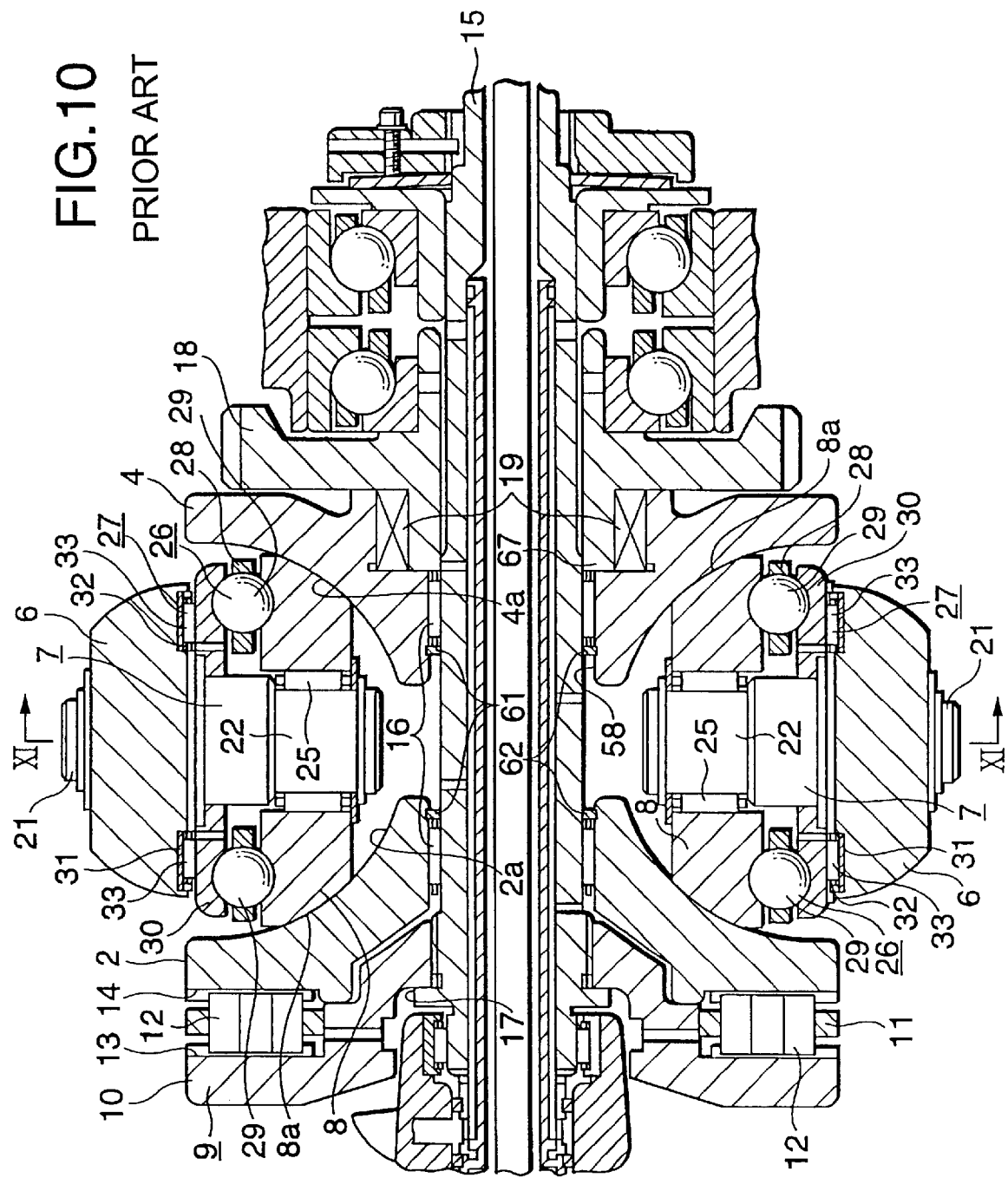
FIG. 10 is a section view of a first example of a conventional specific structure.
Figure 11:
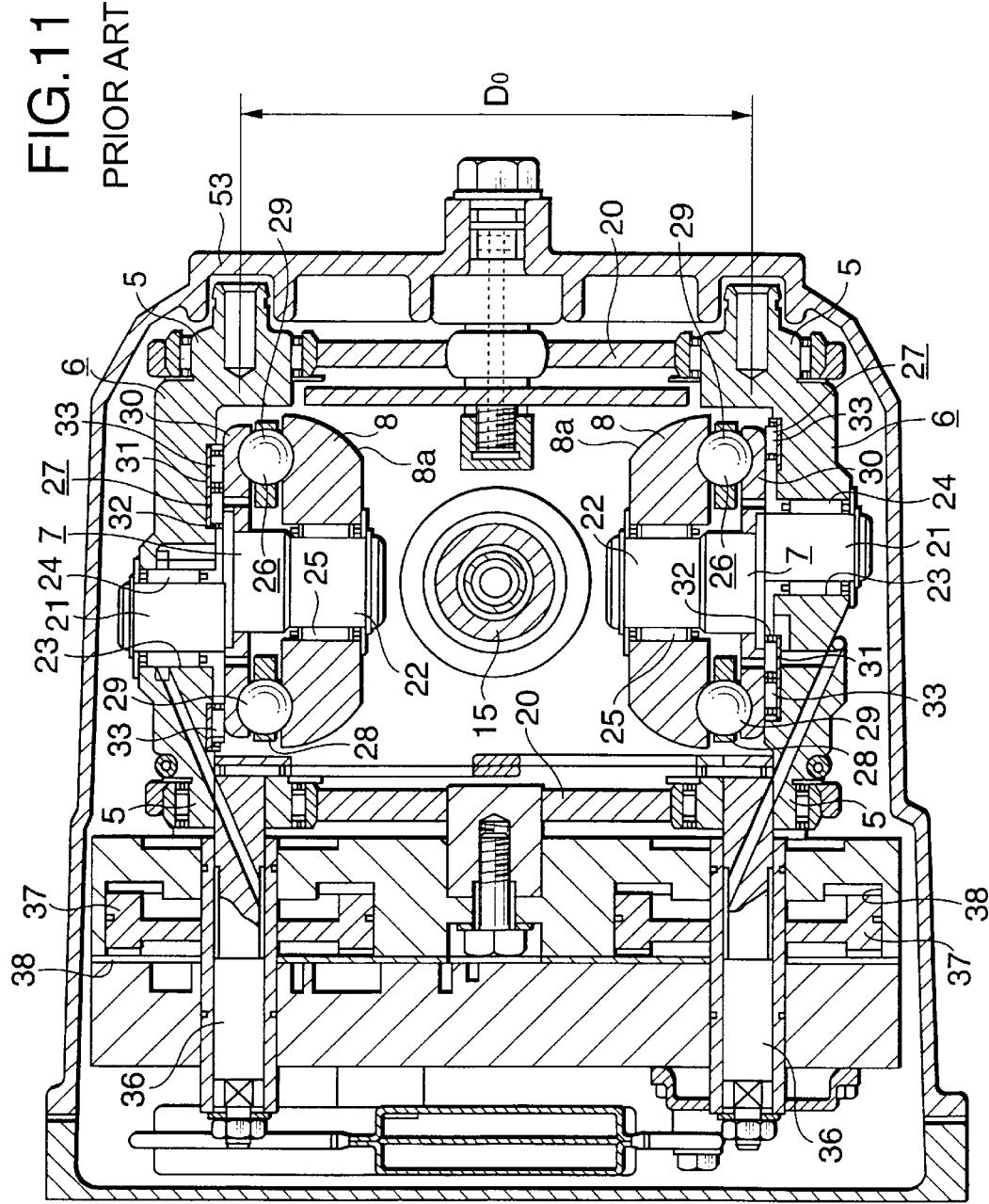
FIG. 11 is a section view taken along the line XI—XI shown in FIG. 10.
Figure 12:
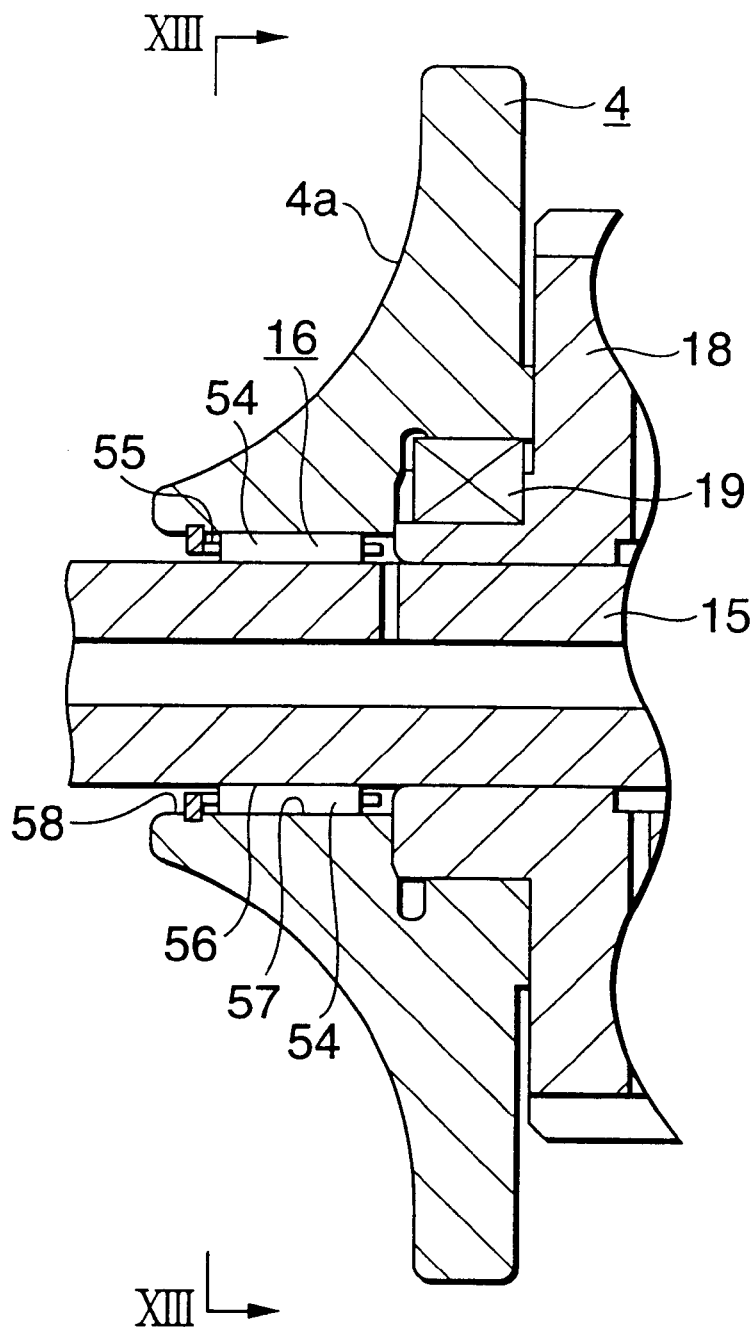
FIG. 12 is an explanatory view of the structure of a conventional toroidal-type continuously variable transmission; in particular.
Figure 13:
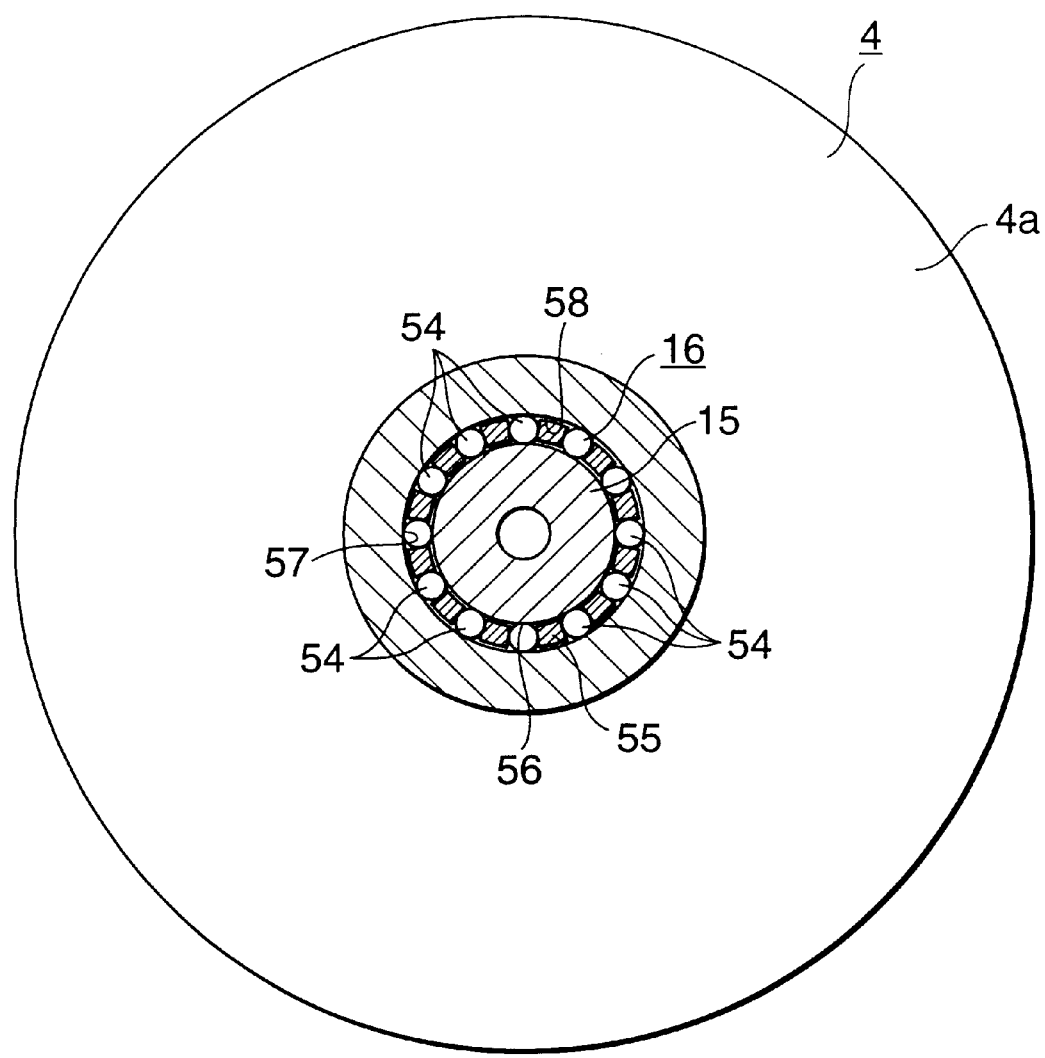
FIG. 13 is a section view taken along the line XIII—XIII shown in FIG. 12.
Figure 14:
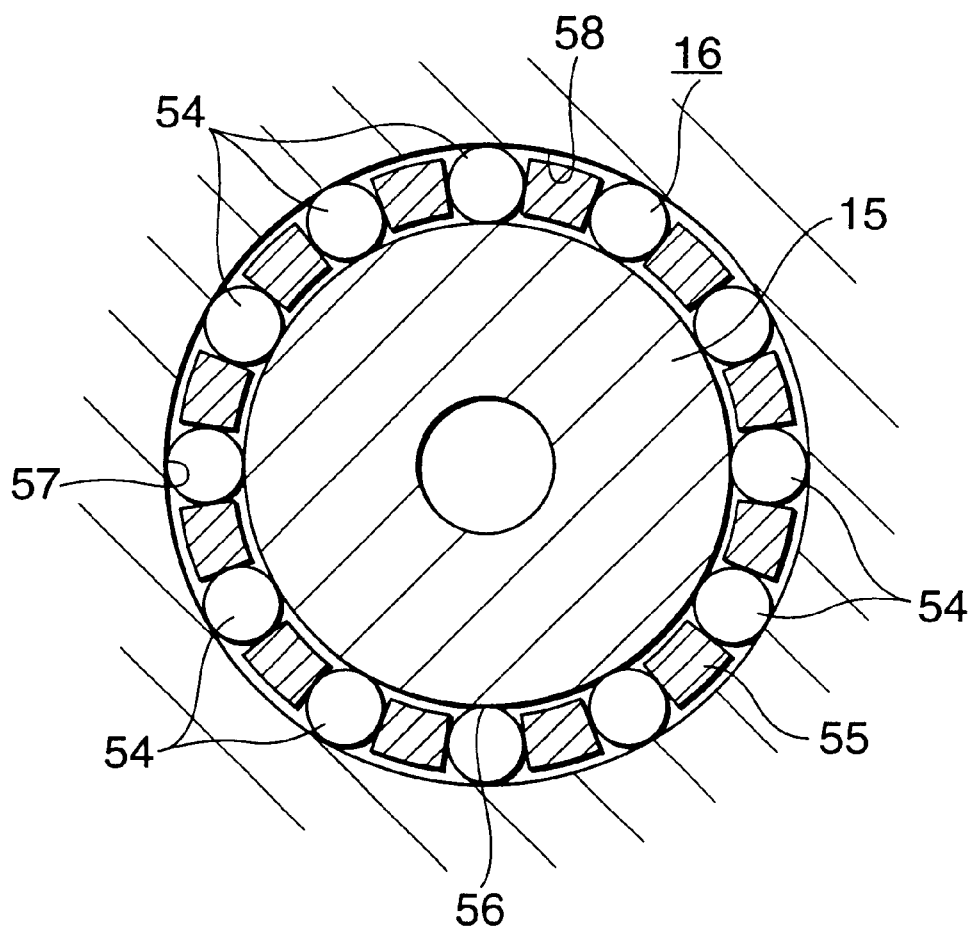
FIG. 14 is an enlarged view of the central portion of FIG. 13.
Figure 15:
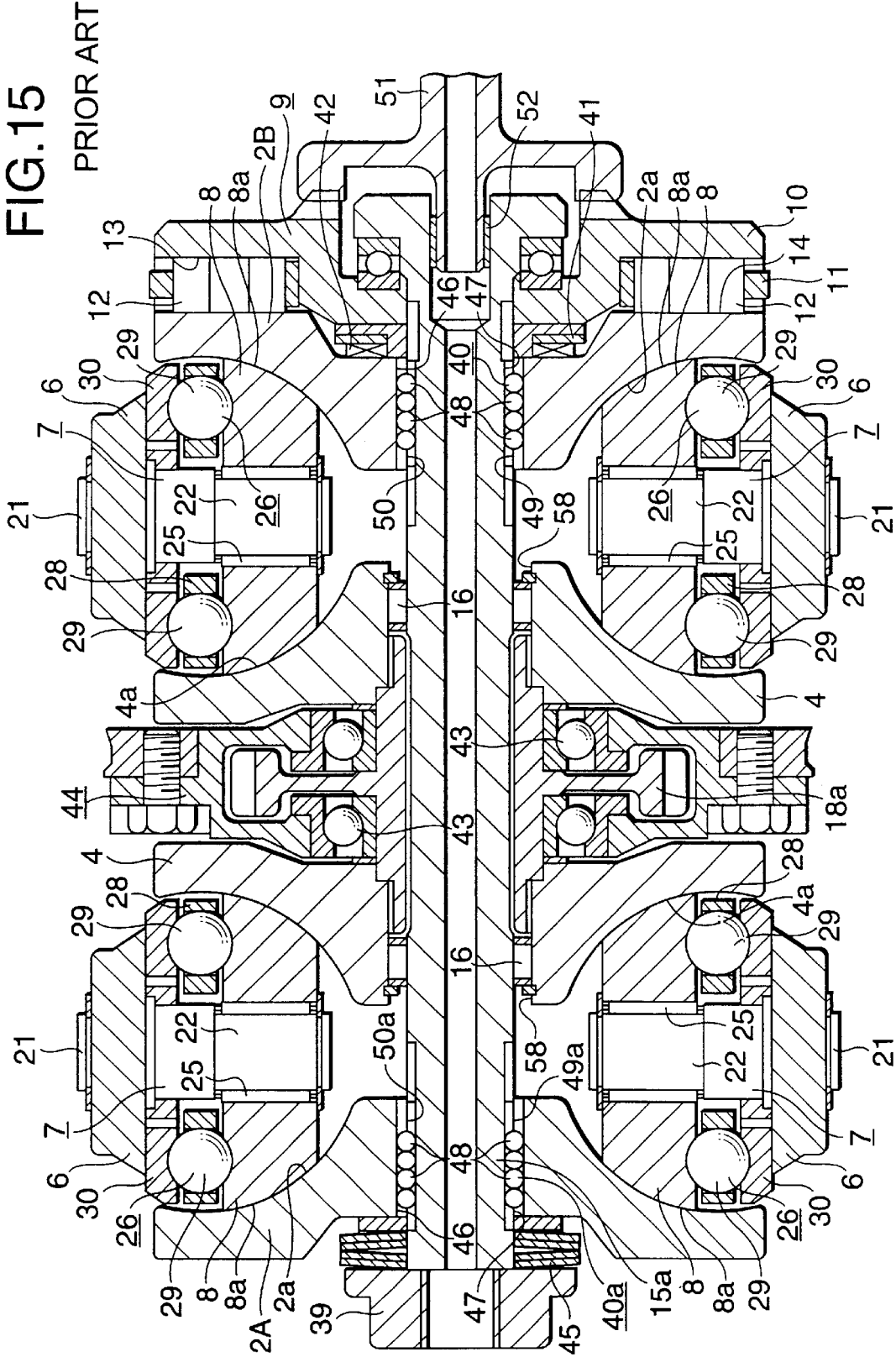
FIG. 15 is a partially section view of a second example of the conventional specific structure.
Figure 16:
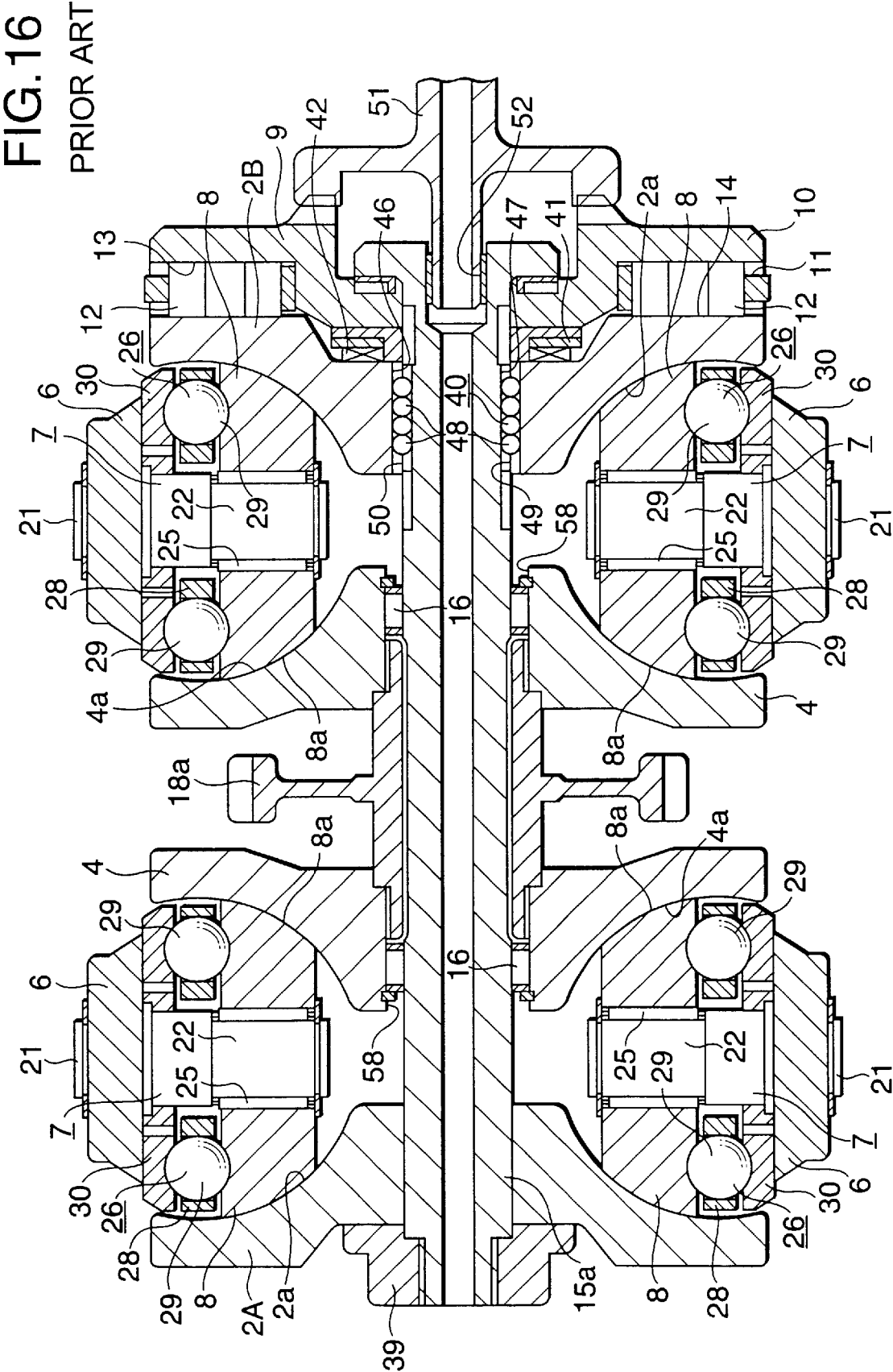
FIG. 16 is a partially sectional view of a third example of the conventional specific structure.
Figure 17:
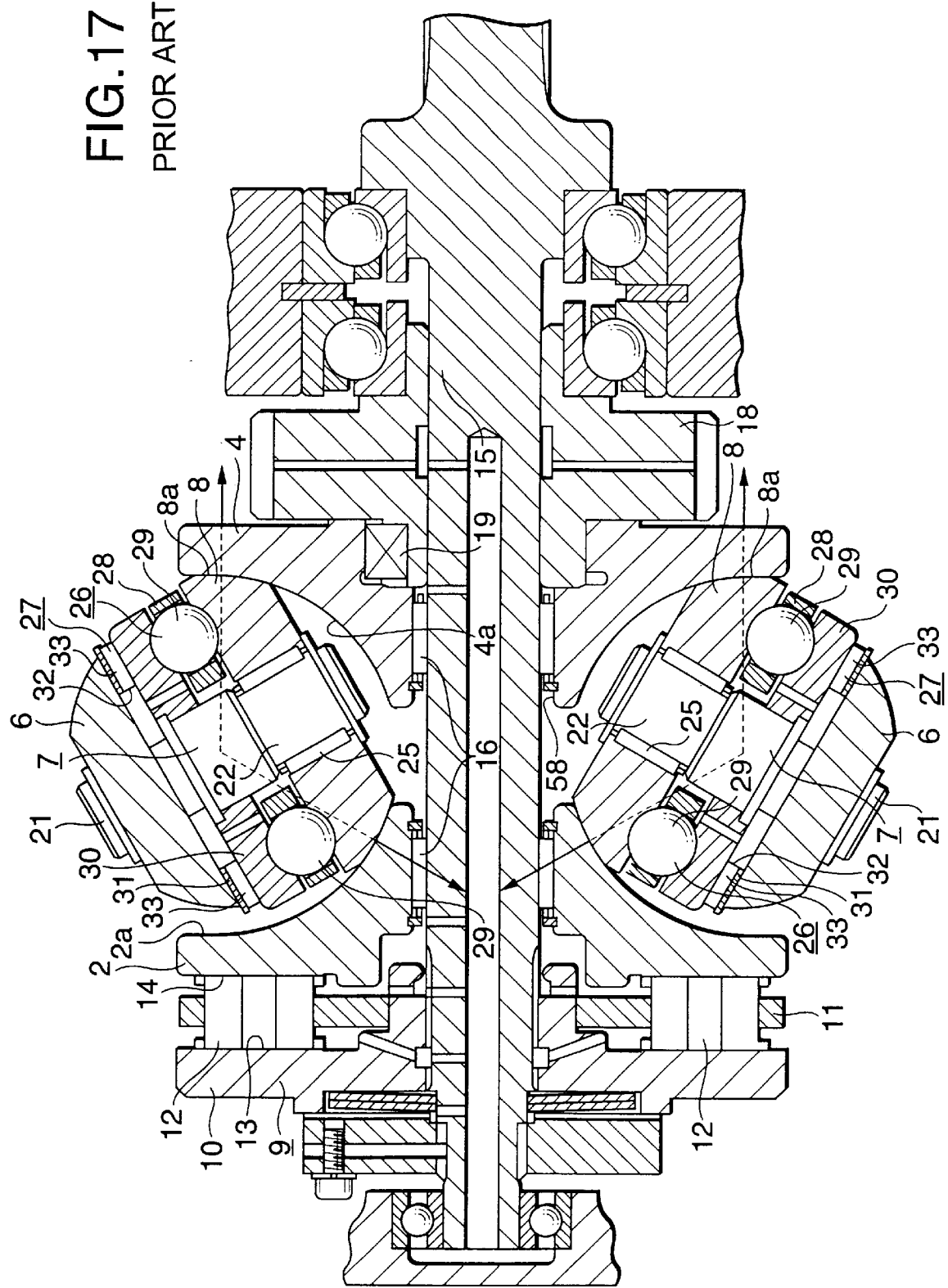
FIG. 17 is a section view of a structure similar to the structure shown in FIG. 10, showing how loads are applied to the power rollers when the present structure is in operation.
Figure 18:
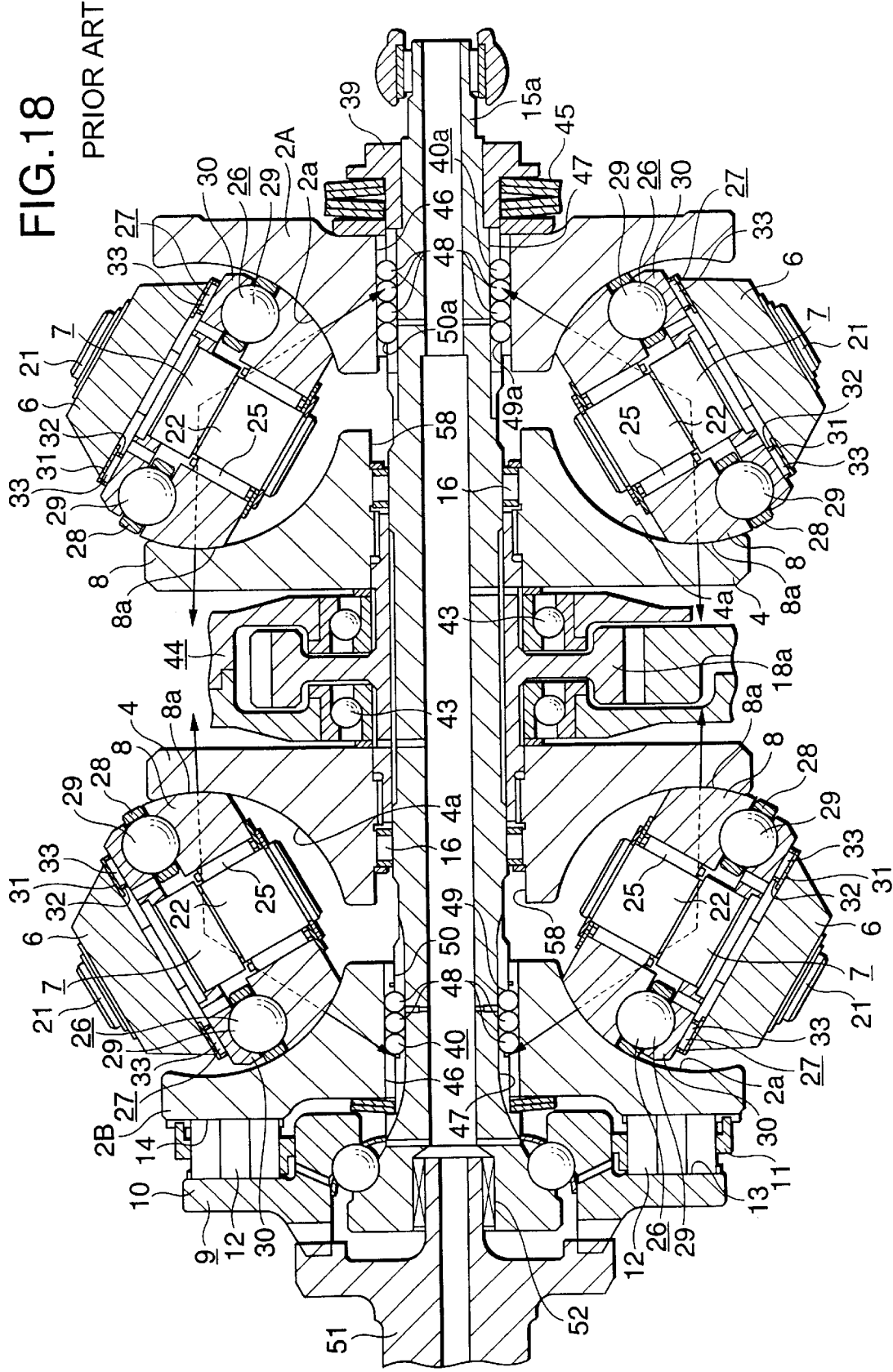
FIG. 18 is a section view of a structure similar to the structure shown in FIG. 15, showing how loads are applied to the power rollers when the present structure is in operation.
Figure 19:
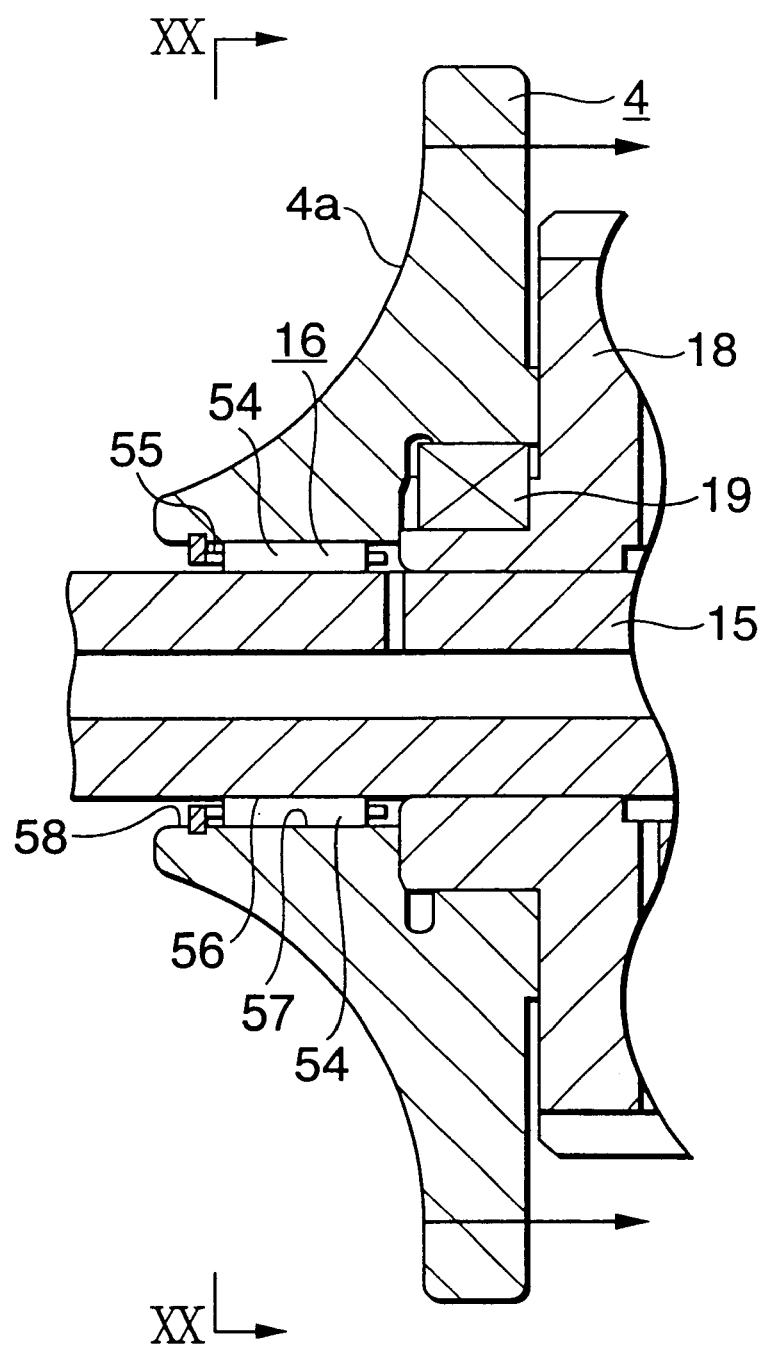
FIG. 19 is a section view of the main portions of the conventional structure shown in FIG. 12, showing a state thereof in which the power rollers of the structure are elastically deformed.
Figure 20:
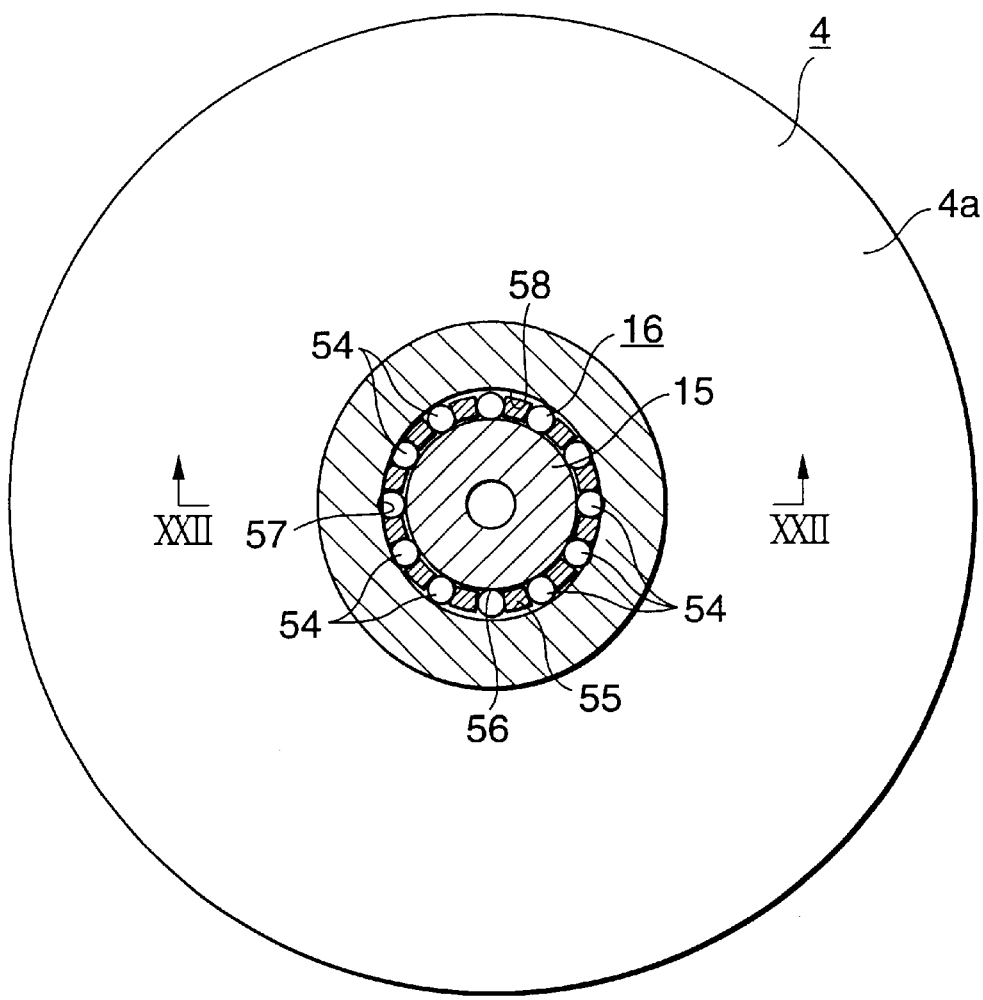
FIG. 20 is a section view taken along the line XX—XX shown in FIG. 19.
Figure 21:
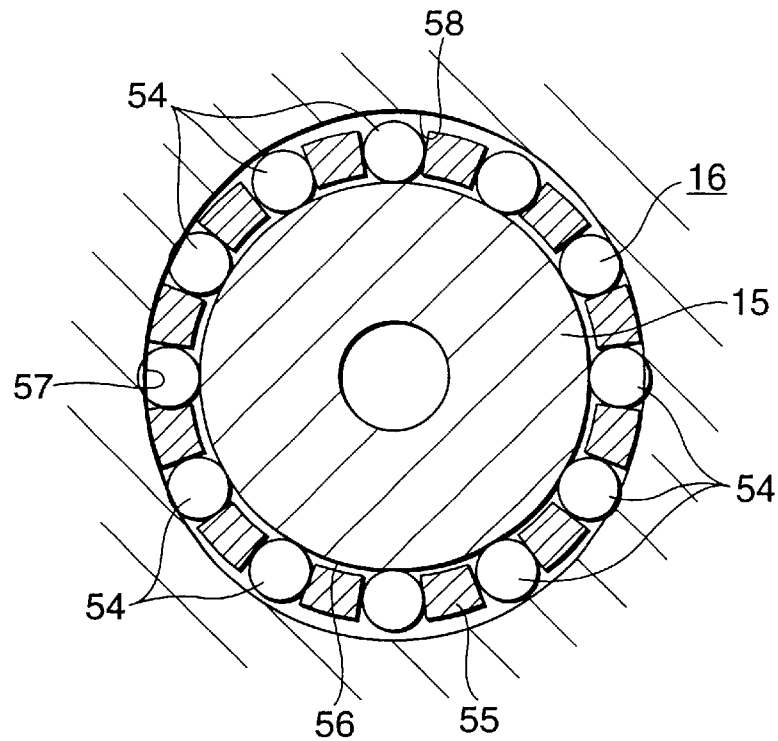
FIG. 21 is an enlarged view of the central portion of FIG. 20.
Figure 22:
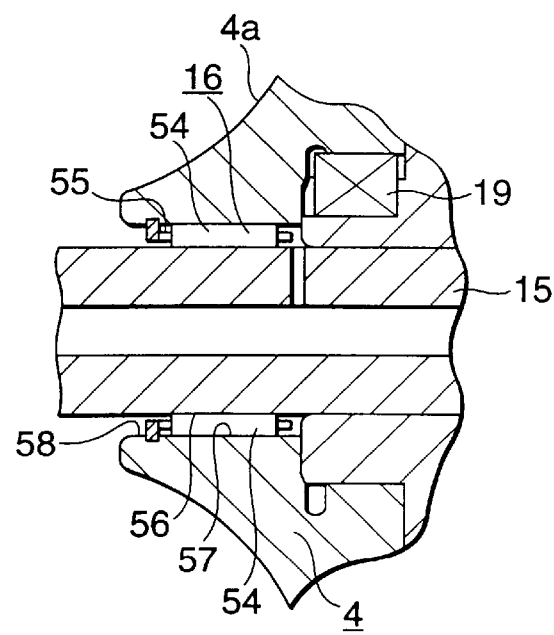
FIG. 22 is a section view taken along the line XXII—XXII shown in FIG. 20.

Now, the results of the deceleration durability experiments conducted in the above-mentioned manner are shown in Table 2 and FIG. 7.

From the experiment results, it has been found that, when the outside diameter of the cylindrical portion 60 of the needle roller 54a is 4 mm, if the crowning amount $\delta_{59}$ is in the range of 0.004 mm–0.016 mm, then a desired target endurance can be obtained; and, when the outside diameter of the cylindrical

TABLE 2

| Experiment Nos. | Crowning amount $\delta_{59}$ at a position distance 1.4 mm from the end of the needle roller | Test results |
|---|---|---|
| A | No crowning | Rollers and shafts of needle roller bearing exfoliated in 9 and 9 hours, respectively. |
| B | 0.002 mm | Rollers and shafts of needle roller bearing exfoliated in 15 and 14 hours, respectively. |
| C | 0.003 mm | Test exceeded target time of 20 hours and terminated after 30 hours. Test was conducted twice. |
| D | 0.007 mm | Test exceeded target time of 20 hours and terminated after 30 hours. Test was conducted twice. |
| E | 0.012 mm | Test exceeded target time of 20 hours and terminated after 30 hours. Test was conducted twice. |
| F | 0.013 mm | Rollers and shafts of needle roller bearing were exfoliated in 14 and 16 hours, respectively. |

TABLE 2-continued

| Experiment Nos. | Crowning amount $\delta_{59}$ at a position distance 1.4 mm from the end of the needle roller | Test results |
|---|---|---|
| G | 0.018 mm (at a position distant 1.5 mm from the end of the needle roller) | Rollers and shafts of needle roller bearing were exfoliated in 5 and 3 hours, respectively. Sounds and vibrations were large. | portion 60 of the needle roller 54a is 3 mm, if the crowning amount $\delta_{59}$ is in the range of 0.003 mm–0.012 mm, then a desired target endurance can be obtained. In these cases, a ratio of the crowning amount $\delta_{59}$ capable of obtaining sufficient endurance to the outside diameter $D_{60}$ of the cylindrical portion 60 of the needle roller 54a is in the range of 0.1%–0.4%. In this case, the measuring position of the crowning amount $\delta_{59}$ was set at a position which is located near to the center of each of the needle rollers 54a in the axial direction thereof by an amount of 7–13% from the end face of the needle roller 54a with respect to the axial length $L_{54a}$ of each of the needle rollers 54a. In the above-mentioned actual deceleration durability experiments, a measuring point was set at a position of 0.8 mm (10.3%) from the end face of the needle roller 54a when the axial length $L_{54a}$ was 7.8 mm (outside diameter=4 mm); and, a measuring point was set at a position of 1.4 mm (10.1%) from the end face of the needle roller 54a when the axial length $L_{54a}$ was 13.8 mm (outside diameter=3 mm).

By the way, of the experiment pieces having the axial length $L_{54a}$ of 7.8 mm (outside diameter=4 mm), the experiment piece No. D was found that, the crowning amount $\delta_{59}$ thereof at a position of 1.0 mm (12.8%) from the end face of each of the needle rollers 54a was 0.008 mm (0.2%) and the crowning amount $\delta_{59}$ thereof at a position of 0.55 mm (7.1%) from the end face of each of the needle rollers 54a was 0.011 mm (0.28%); that is, the experiment piece No. D satisfied at both positions thereof the conditions that are specified in the scope of the patent claims appended to this specification. Also, of the experiment pieces having the axial length $L_{54a}$ of 13.8 mm (outside diameter=3 mm), the experiment piece No. D was found that the crowning amount $\delta_{59}$ thereof at a position of 1.8 mm (13.0%) from the end face of each of the needle rollers 54a was 0.006 mm (0.2%) and the crowning amount $\delta_{59}$ thereof at a position of 1.0 mm (7.2%) from the end face of each of the needle rollers 54a was 0.008 mm (0.27%); that is, the experiment piece No. D satisfied at both positions thereof the conditions that are specified in the scope of the patent claims appended to this specification.

Accordingly, the toroidal-type continuously variable transmission structured and operating in the above-mentioned manner not only has excellent durability but also can contribute to realization of the practical use.

[Second Embodiment]

A toroidal-type continuously variable transmission according to a second embodiment of the invention is characterized by the shape and property of the inner peripheral surface of a disk such as an output-side disk 4 or the like including a fitting portion and an outer race raceway formed in the inner peripheral surface thereof. The structure and operation of the other remaining portions of the present toroidal-type continuously variable transmission are similar to those of the previously described toroidal-type continuously variable transmission and, therefore, the description of the equivalent portions of the present invention is omitted or simplified here. Thus, description will be given below mainly of the characteristic portions of the invention.

Figure 23:
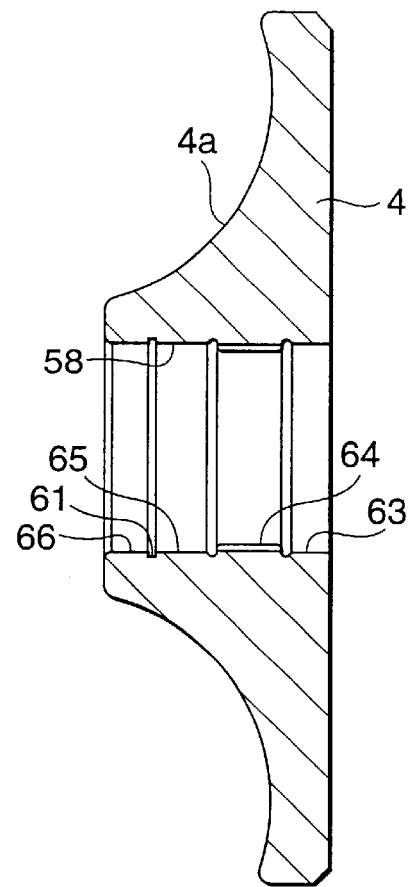
FIG. 23 is a section view of an output-side disk used in the structure of a toroidal-type continuously variable transmission according to the invention.
Figure 24:
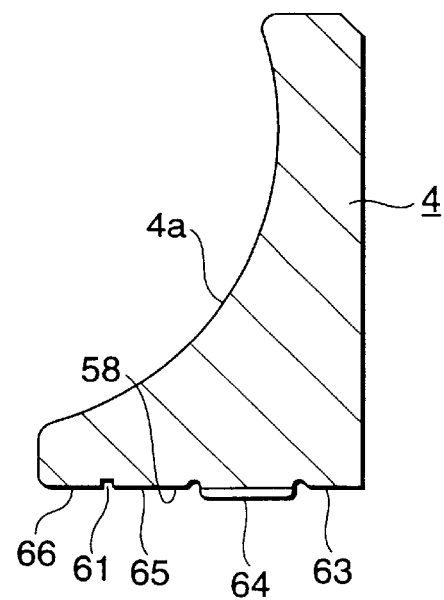
FIG. 24 is a section view of a half section of the output-side disk shown in FIG. 23.

An output-side disk 4 constructing a toroidal-type continuously variable transmission according to the invention, similarly to the output-side disk 4 constructing the previously described toroidal-type continuously variable transmission, is also structured in such a manner as shown in FIGS. 23 and 24. That is, in a center hole 58 formed in the central portion of the output-side disk 4, there are formed a cylindrical surface portion 63 corresponding to a fitting portion, a spline portion 64, an outer race raceway portion 65, and a second cylindrical surface portion 66 sequentially in this order from the outer surface side (in FIGS. 23 and 24, the right side) of the center hole 58. In the portion of the inner peripheral surface of the center hole 58 that is situated near to the inner surface 4a thereof, by shot peening this portion from an opening formed in the second cylindrical surface portion 66, there is formed a residual compressive pressure layer. In this shot peening operation, a masking operation is not executed on any portion of the inner peripheral surface of the center hole 58. Therefore, the residual compressive pressure layer is formed not only in the second cylindrical surface portion 66 but also in the outer race raceway portion 65. On the other hand, in the case of the output-side disk 4 constructing a toroidal-type continuously variable transmission according to the invention, the residual compressive pressure layer formed in the outer race raceway portion 65 is removed by grinding so that the outer race raceway portion 65 is formed as a smooth surface.

In the above-structured toroidal-type continuously variable transmission according to the invention, of the above-mentioned respective portions of the center hole 58 formed in the central portion of the output-side disk 4, there is formed the residual compressive stress layer in the second cylindrical surface portion 66 to which the greatest tensile stress is applied as the toroidal-type continuously variable transmission is operated. Thanks to this, the durability of the output-side disk 4 can be secured in spite of the fact that tensile stresses are repetitively applied to the inner peripheral surface portion of the center hole 58 due to large thrust loads applied from the power roller 8, 8 (FIGS. 10 and 11) in accordance with the operation of the toroidal-type continuously variable transmission.

Figure 25:
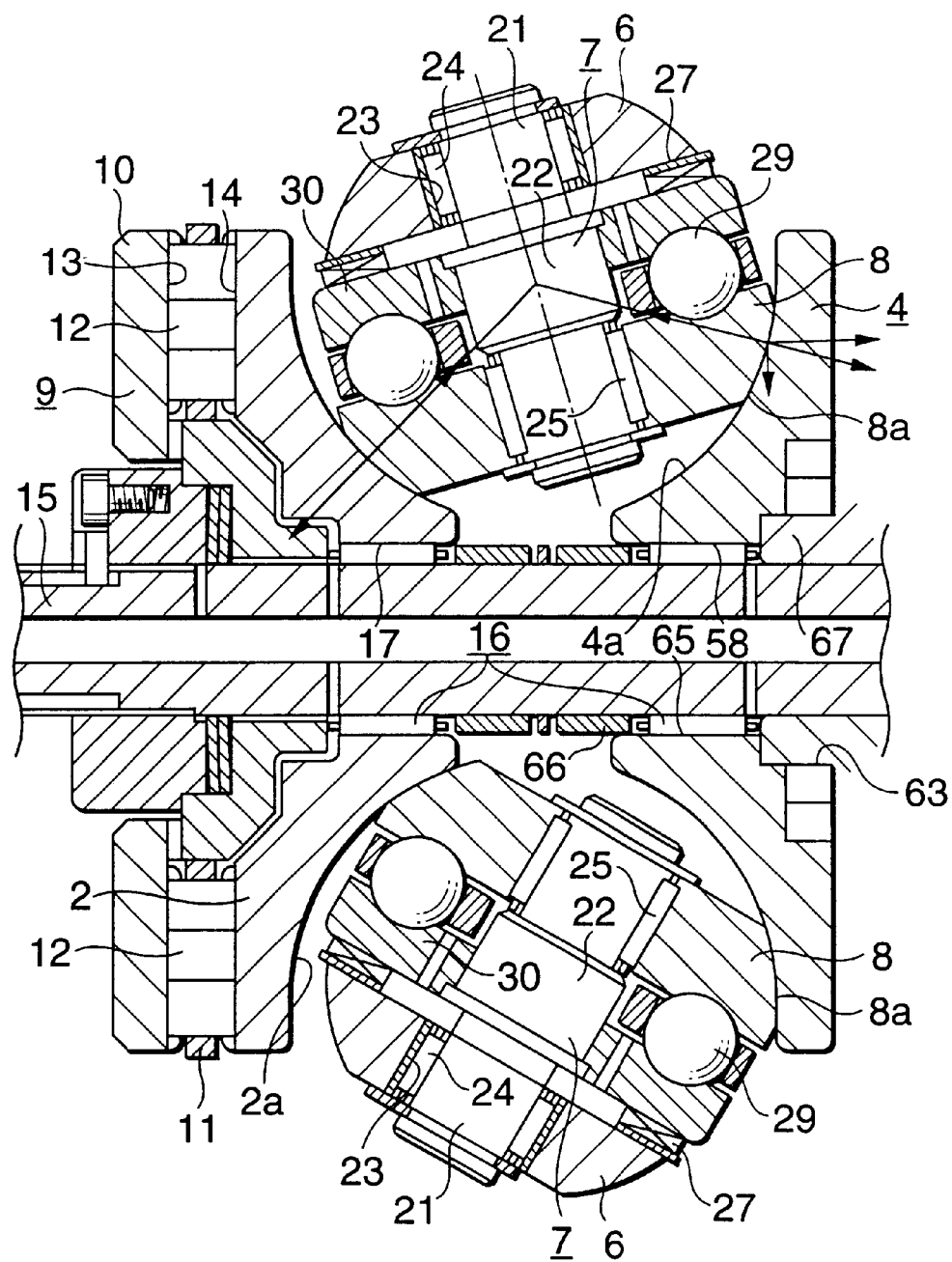
FIG. 25 is a partially section view of a toroidal-type continuously variable transmission, showing how forces are applied to the respective disks thereof in deceleration.
Figure 26:
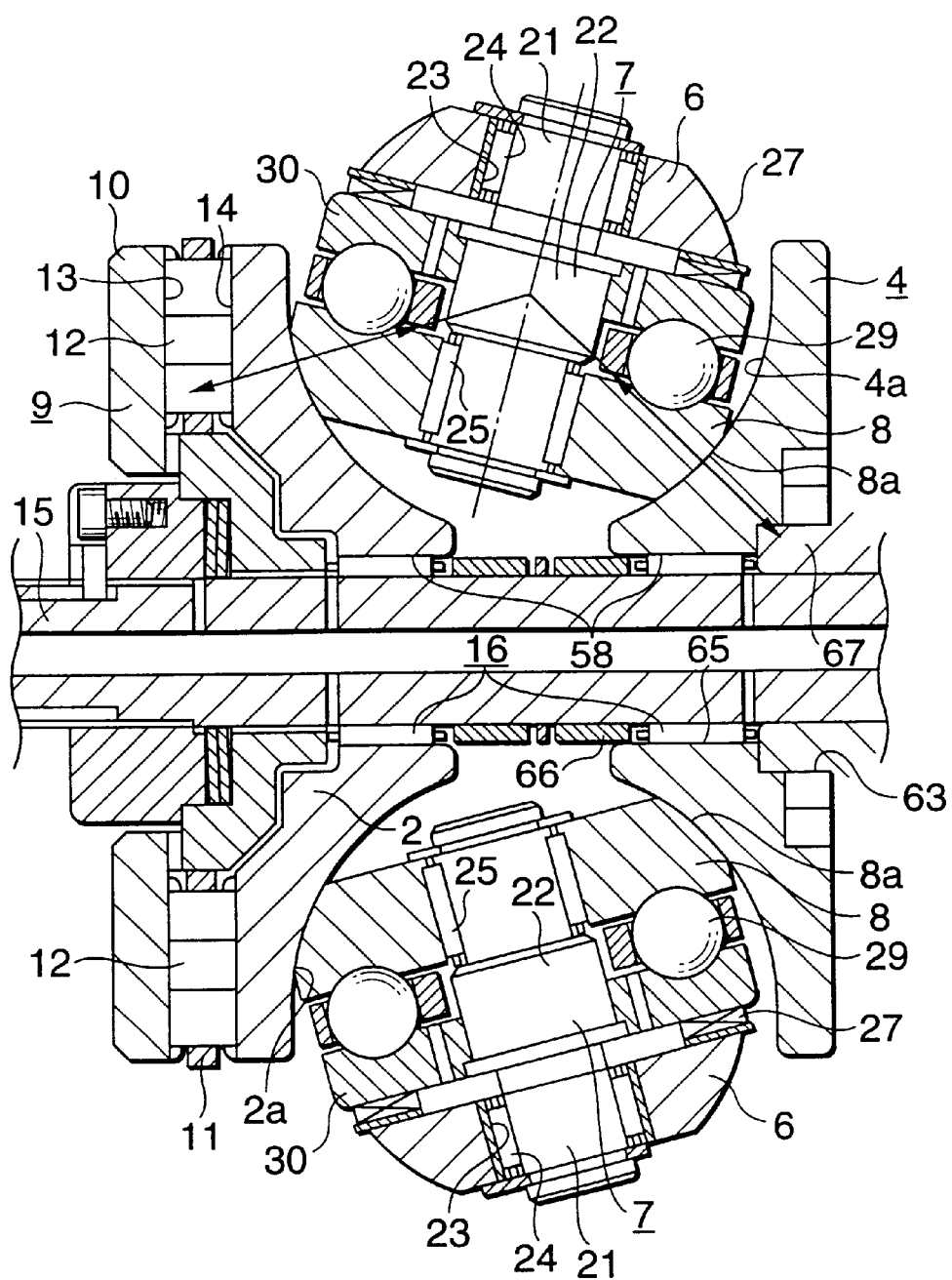
FIG. 26 is a partially section view of a toroidal-type continuously variable transmission similarly to FIG. 25, showing how forces are applied to the respective disks thereof in acceleration; and, FIG. 27 is a view of an output-side disk used in a structure of the toroidal-type continuously variable transmission and is viewed from the left side of FIG. 25, showing the deformed state of the output-side disk by a thrust load in an exaggerated manner.
Figure 27:
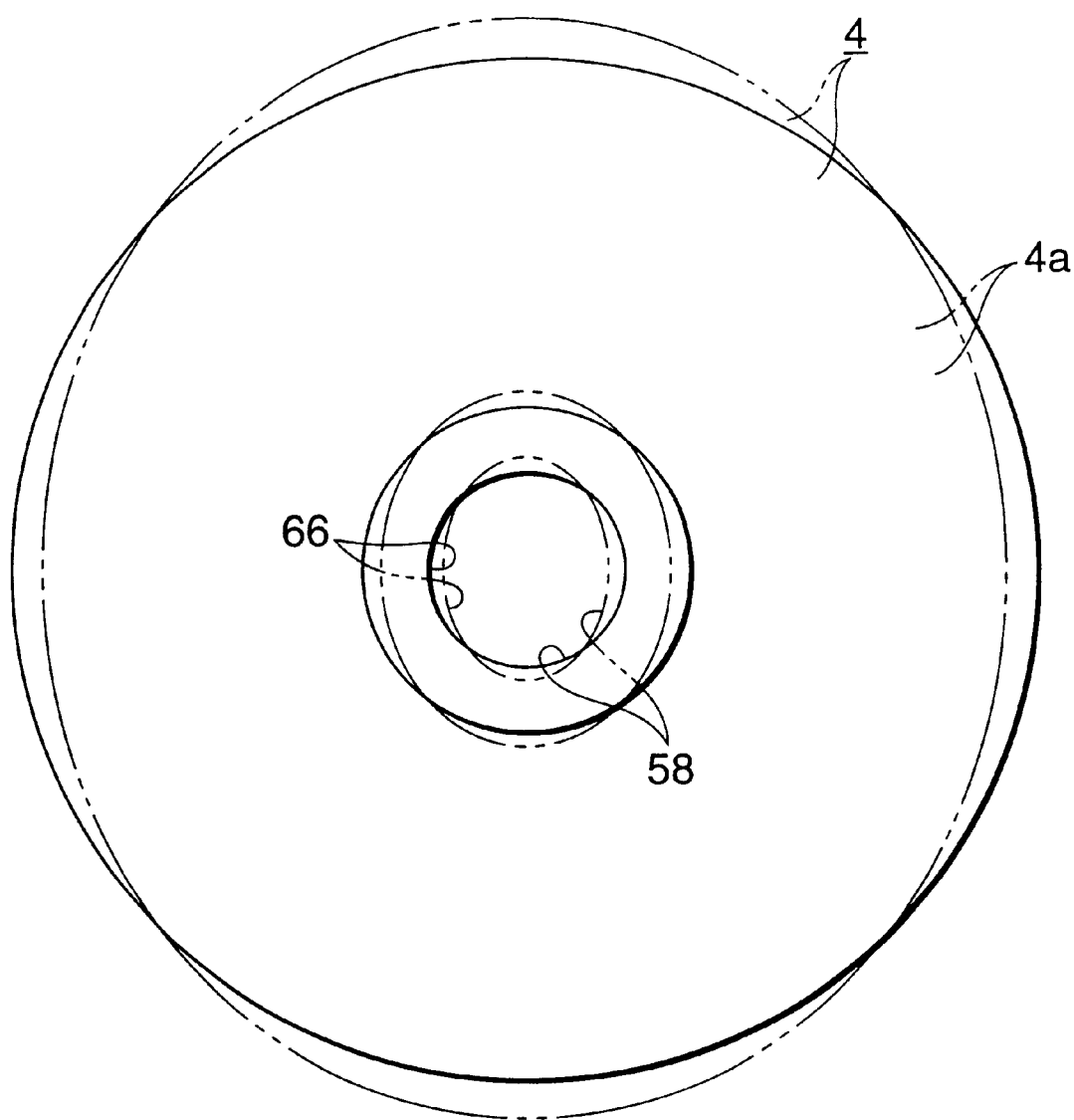

Also, since the outer race raceway portion 65 is formed as a smooth surface, the durability of the needle roller bearing 16 (FIGS. 10, 25 and 26) including the outer race raceway portion 65 can also be secured.

By the way, the disk being the characteristic portion of the invention is not limited to the output-side disk that has been illustrated herein but it is also possible to use an input-side disk, provided that it includes a fitting portion and an outer race raceway.

Since the present invention is structured and operates in the above-mentioned manner, the durability of a disk and a needle roller bearing supporting the disk can be secured sufficiently, thereby being able to contribute to realization of the practical use of a toroidal-type continuously variable transmission.

While only certain embodiments of the invention have been specifically described herein, it will apparent that numerous modifications may be made thereto without departing from the spirit and scope of the invention.

The present disclosure relates to the subject matter contained in Japanese patent applications No.Hei10-372343 filed on Dec. 28, 1998 and No. Hei11-11968 field on Jan. 20, 1999 which are expressly incorporated herein by reference in its entirety.

What is claimed is:

1. A toroidal-type continuously variable transmission, comprising:
   a rotatable input shaft;
   an input-side disk formed concentrical with said input shaft and rotatably supported in conjunction with said input shaft, said input-side disk including an inside surface being a concave surface formed in an arc-shaped section;
   an output-side disk rotatable with respect to said input shaft and including an inside surface opposed to said inside surface of said input-side disk, said inside surface being a concave surface formed in an arc-shaped section;
   a plurality of trunnions each swingable about said associated pivot shaft situated at a torsional relation with respect to said input shaft;
   a plurality of displacement shafts each supported in the intermediate portion of said trunnion in such a manner that said displacement shaft projects from an inside surface of said trunnion;
   a plurality of power rollers each including a peripheral surface formed in a spherical-shaped convex surface, said power roller each being rotatably supported in the periphery of said displacement shaft in such a manner that said power roller is disposed on the inside surface of said trunnion and is interposed between said input-side and output-side disks; and,
   a radial needle roller bearing rotatably supporting said output-side disk on said input shaft;
   wherein said radial needle roller bearing includes a plurality of needle rollers, the two end portions of each of said needle rollers in the axial direction thereof are crowned, and the crowning amount is set such that, in the portion of said needle roller that is situated by 7–13% of the axial-direction length toward the axial-direction central portion of said needle roller from the axial-direction end face of said needle roller, said crowning amount is 0.1–0.4% of the outside diameter of said axial-direction central portion of said needle roller.

2. A toroidal-type continuously variable transmission, comprising:
   an input-side disk and an output-side disk formed concentrically with each other and supported so as to be rotatable independently of each other, said input and output-side disks including their respective inside surfaces opposed to each other, each of said inside surfaces being a concave surface having an arc-shaped section;
   a rotary shaft inserted through inner peripheral portions of said input and output-side disks;
   a plurality of trunnions each swingable about said associated pivot shaft situated at a torsional relation with respect to said rotary shaft;
   a plurality of displacement shafts each supported on said trunnion, respectively;
   a plurality of power rollers each including a peripheral surface formed in a spherical-shaped convex surface, said power roller being rotatably supported on said displacement shaft and interposed between said respective inside surfaces of said input side and output-side disks; and,
   a needle roller bearing interposed between an inner peripheral surface of at least one of said input and output-side disks and an outer peripheral surface of said rotary shaft,
   wherein, in the inner peripheral surface of at least one of said input and output-side disks, there are formed a fitting portion to be fitted outside with a member rotatable in conjunction with said disk and an outer race raceway portion for said needle roller bearing;
   at least in the portion of the inner peripheral surface of said disk that is situated near to said inside surface of said disk, there is formed a residual compressive stress layer by shot peening; and,
   said outer race raceway portion is ground so as to remove at least a portion of said residual compressive stress layer, to thereby form said outer race raceway portion as a smooth surface.

3. A toroidal-type continuously variable transmission, comprising:
   an input shaft;
   an input-side disk formed concentrical with said input shaft and rotatably supported in conjunction with said input shaft, said input-side disk including an inside surface being a concave surface formed in an arc-shaped section;
   an output-side disk rotatable with respect to said input shaft and including an inside surface opposed to said inside surface of said input-side disk, said inside surface being a concave surface formed in an arc-shaped section;
   a plurality of trunnions each swingable about said associated pivot shaft situated at a torsional relation with respect to said input shaft;
   a plurality of displacement shafts each supported on said trunnion, respectively;
   a plurality of power rollers each including a peripheral surface formed in a spherical-shaped convex surface, said power roller being rotatably supported on said displacement shaft and interposed between said input-side and output-side disks; and,
   a needle roller bearing interposed between an inner peripheral surface of said output-side disk and an outer peripheral surface of said input shaft,
   wherein, in the inner peripheral surface of said output-side disk, there are formed a fitting portion to be fitted outside with a member rotatable in conjunction with said output-side disk and an outer race raceway portion for said needle roller bearing;
   in the portion of the inner peripheral surface of said output-side disk that is situated near to said inside surface thereof, there is formed a residual compressive stress layer by shot peening; and,
   said outer race raceway portion is ground so as to remove a portion of said residual compressive stress layer, to thereby form said outer race raceway portion as a smooth surface.

4. A method for manufacturing a toroidal-type continuously variable transmission, said toroidal-type continuously variable transmission comprising:
   an input-side disk and an output-side disk formed concentrically with each other and supported so as to be rotatable independently of each other, said input and output-side disks including their respective inside surfaces opposed to each other, each of said inside surfaces being a concave surface having an arc-shaped section;
   a rotary shaft inserted through inner peripheral portions of said input and output-side disks;
   a plurality of trunnions each swingable about said associated pivot shaft situated at a torsional relation with respect to said rotary shaft;

a plurality of displacement shafts each supported on said trunnion, respectively;

a plurality of power rollers each including a peripheral surface formed in a spherical-shaped convex surface, said power roller being rotatably supported on said displacement shaft and interposed between said respective inside surfaces of said input side and output-side disks; and, a needle roller bearing interposed between an inner peripheral surface of at least one of said input and output-side disks and an outer peripheral surface of said rotary shaft, wherein, in the inner peripheral surface of at least one of said input and output-side disks, there are formed a fitting portion to be fitted outside with a member rotatable in conjunction with said disk and an outer race raceway portion for said needle roller bearing, said method comprising the steps of:

shot peening at least in the portion of the inner peripheral surface of said disk that is situated near to said inside surface of said disk, to thereby form a residual compressive stress layer; and, grinding said outer race raceway portion so as to remove at least a portion of said residual compressive stress layer, to thereby form said outer race raceway portion as a smooth surface.

* * * * *